(12) United States Patent
Souma

(10) Patent No.: US 7,679,837 B2
(45) Date of Patent: Mar. 16, 2010

(54) ZOOM OPTICAL SYSTEM, IMAGE PICKUP DEVICE, AND DIGITAL APPARATUS

(75) Inventor: Yoshihito Souma, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/119,698

(22) Filed: May 13, 2008

(65) Prior Publication Data

US 2008/0285150 A1    Nov. 20, 2008

(30) Foreign Application Priority Data

May 14, 2007    (JP) .............................. 2007-128018

(51) Int. Cl.
*G02B 15/14*    (2006.01)
(52) U.S. Cl. .................. 359/690; 359/676; 359/683; 359/689
(58) Field of Classification Search ......... 359/682–683, 359/685–687, 689–690, 676
See application file for complete search history.

(56) References Cited

U.S. PATENT DOCUMENTS 7,158,315 B2 *    1/2007    Shibayama ................. 359/690

FOREIGN PATENT DOCUMENTS

| JP | 8-248317 A | 9/1996 |
| JP | 2005-43630 A | 2/2005 |

* cited by examiner

*Primary Examiner*—Darryl J Collins
*Assistant Examiner*—Zachary Wilkes
(74) *Attorney, Agent, or Firm*—Sidley Austin LLP

(57) ABSTRACT

A zoom optical system at least includes in the order from an object side: a first lens group having a positive optical power; a second lens group having a negative optical power; and a third lens group having a positive optical power. In zooming from a wide angle end to a telephoto end, a distance between the first lens group and the second lens group is increased, and a distance between the second lens group and the third lens group is decreased. The first lens group includes at least one negative lens element, and the second lens group includes a negative lens element closest to the object side, with a lens surface of the negative lens element being concave toward an image side. The zoom optical system satisfies the following conditional expressions (1) and (2):

$$vd_2 < 30 \qquad (1)$$

$$50 > vd_{1n} > 30 \qquad (2)$$

where $vd_2$ represents the Abbe number of the negative lens element closest to the object side in the second lens group, and $vd_{1n}$ represents an Abbe number of a negative lens element, or an average Abbe number of negative lens elements in the first lens group.

18 Claims, 19 Drawing Sheets

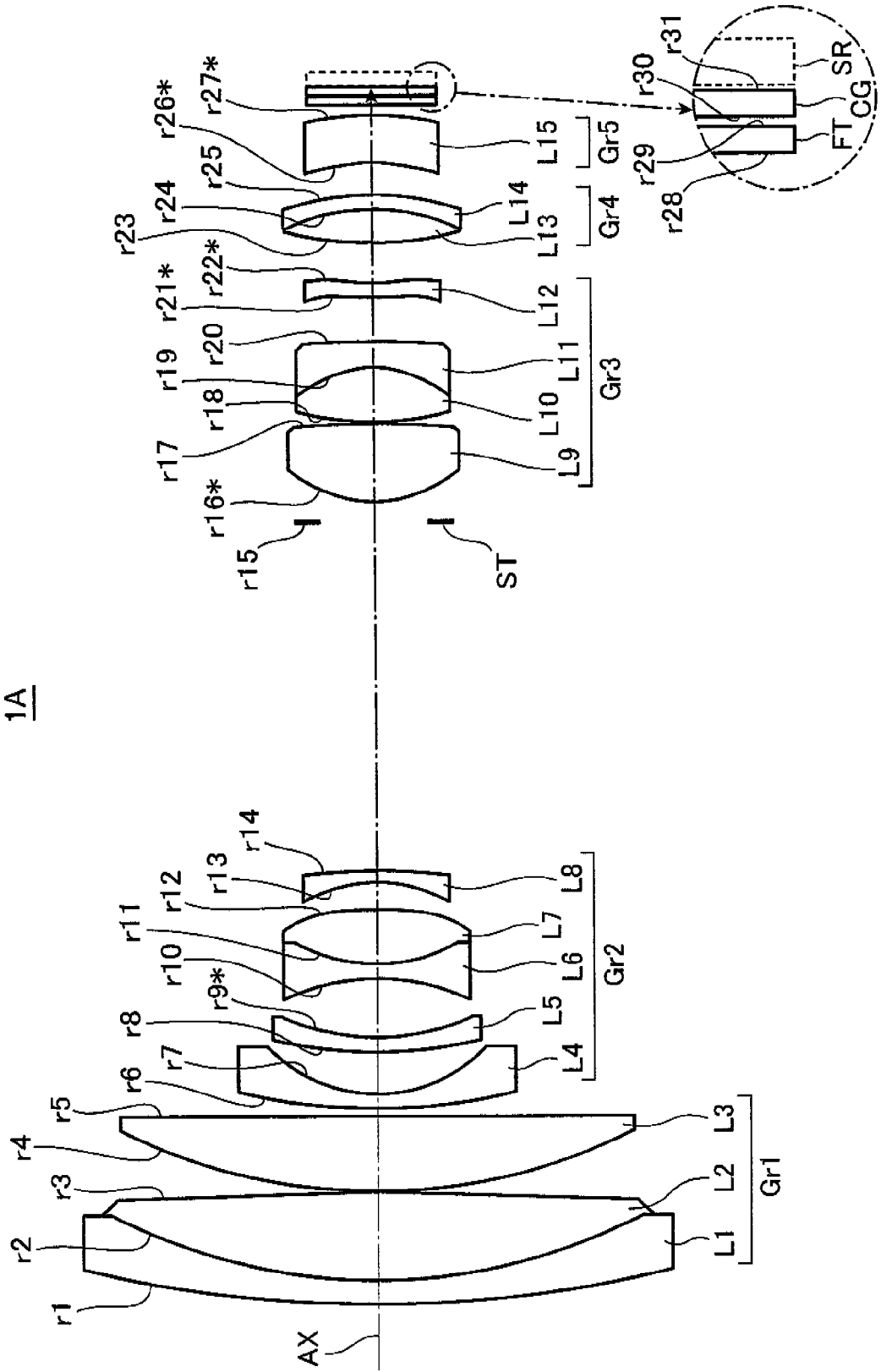

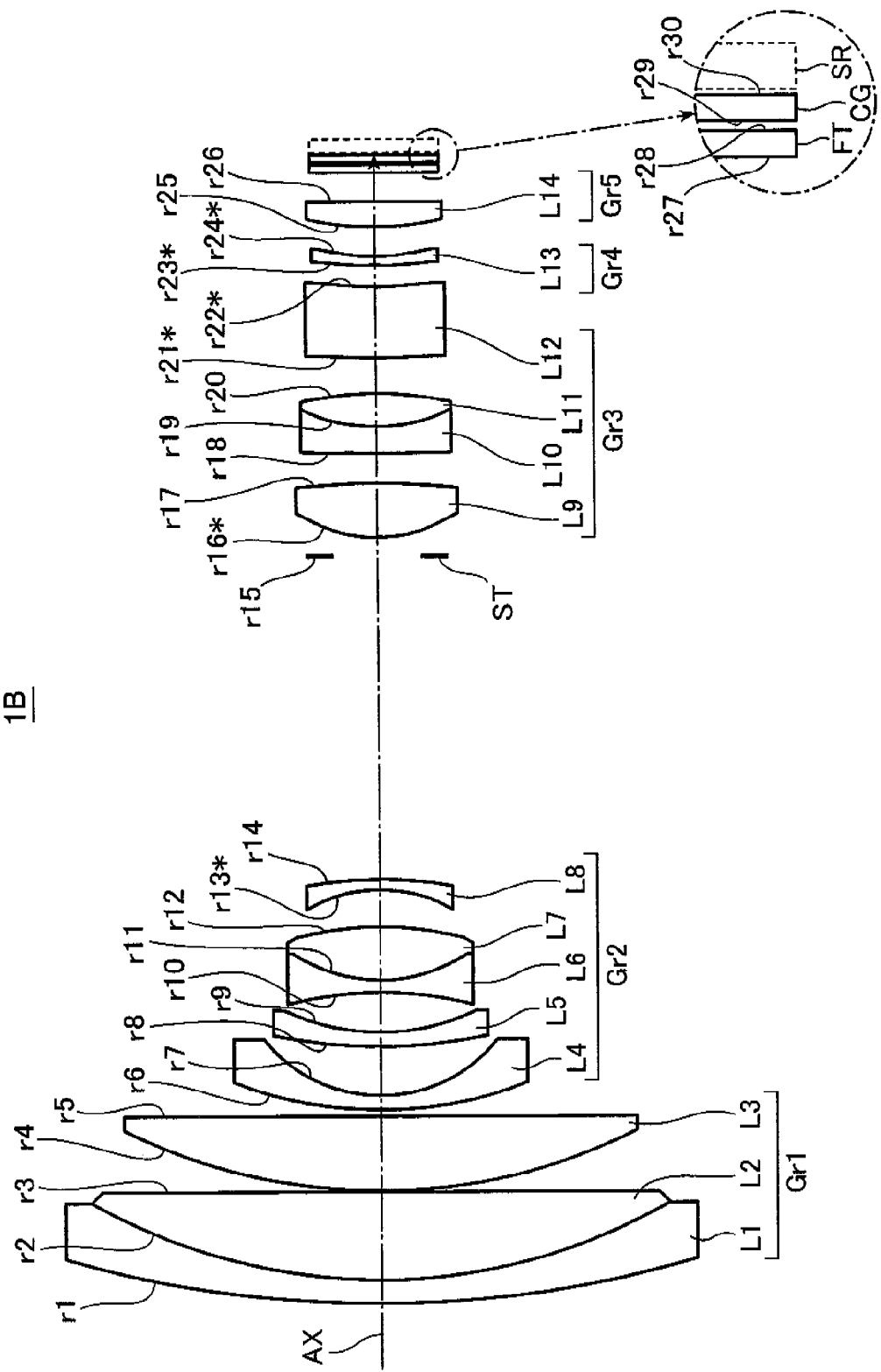

ZOOM OPTICAL SYSTEM, IMAGE PICKUP DEVICE, AND DIGITAL APPARATUS

This application is based on Japanese Patent Application No. 2007-128018 filed on May 14, 2007, the contents of which are hereby incorporated by reference.

BACKGROUND OF THE INVENTION

1. Field of the Invention

The present invention relates to a zoom optical system for use in an optical unit or a like device, and more particularly to a compact zoom optical system having a large zoom ratio and operable to desirably correct chromatic aberration, as well as an image pickup device incorporated with the zoom optical system, and a digital apparatus loaded with the image pickup device.

2. Description of the Related Art

In recent years, digital cameras are rapidly spread, and are widely used not only as means for inputting images into a personal computer, but also as a tool for keeping photos, as well as conventional silver halide cameras. As the digital cameras are widely spread, a demand for a compact and high-function zoom lens unit having a large zoom ratio or a wide angle is increased. Also, since the number of pixels of an image sensor is being increased year by year, there is a demand for high optical performance. Further, there is a demand for high optical performance, as compared with a conventional arrangement, in an apparatus such as a cam recorder primarily used in recording moving images, considering a still image photographing function and a demand for compatibility with high definition devices.

As a zoom lens system for satisfying the aforementioned demands, there is known e.g. a positive-dominant zoom lens unit comprising, in the order from the object side: a first lens group unmovable in zooming and having a positive optical power; a second lens group having a negative optical power and movable along an optical axis for zooming; a third lens group movable along the optical axis to keep the position of image plane at a fixed position in zooming; and a fourth lens group having a positive optical power and adapted to perform a focusing operation (see e.g. Japanese Unexamined Patent Publication No. 2005-43630 or D1).

As a lens unit suitable for a cam recorder, there is known a positive-dominant zoom lens unit comprising, in the order from the object side: a first lens group unmovable in zooming and having a positive optical power; a second lens group having a negative optical power and movable along an optical axis for zooming; a third lens group unmovable in zooming; and a fourth lens group movable along the optical axis to keep the position of image plane at a fixed position in zooming (see e.g. Japanese Unexamined Patent Publication No. Hei 8-248317 or D2).

Generally, if a large zoom ratio is attempted to be secured in a zoom lens unit, while retaining the size of the zoom lens unit, optical powers of the lens surfaces of the zoom lens unit may be unduly increased, which may degrade various aberrations. A certain degree of improvement may be obtained concerning Seidel aberration by increasing the number of aspherical surfaces, using a lens material having a large refractive index, or providing a like measure. However, it is difficult to obtain improvement on chromatic aberrations such as on-axis chromatic aberration or magnification chromatic aberration, unless a diffraction element such as a DOE (Diffractive Optical Element) or a special material such as fluorite is used, the number of lens elements is increased, or a like measure is provided. In particular, reducing second-order spectra of on-axis chromatic aberration at a telephoto end, or second-order spectra of magnification chromatic aberration at a wide angle end is an important task to perform, not to mention correction of first-order chromatic aberration.

For instance, D1 discloses reducing residual chromatic aberration by using a medium having a property that dispersion is changed in an optical axis direction. Use of the medium having the above property, however, may be disadvantageous in the aspect of productivity or cost. D2 discloses reducing residual chromatic aberration by properly setting dispersion values and partial dispersion ratios of the lens groups. However, the zoom ratio obtainable by the arrangement of D2 is at most about eight times, which is not a sufficiently large zoom ratio. Also, the first lens group requiring a large beam diameter includes a certain number of lens elements made of a low dispersion material such as fluorite, which is disadvantageous in the aspect of cost. It may be effective to increase the number of lens elements in order to secure latitude in correcting chromatic aberration, or reduce the refractive powers of the lens elements in order to reduce the aberration amount. The above measures, however, may be disadvantageous in the aspect of cost or size.

SUMMARY OF THE INVENTION

In view of the above conventional examples, it is an object of the present invention to provide a compact and high-performance zoom optical system having a large zoom ratio while suppressing cost increase, as well as an image pickup device incorporated with the zoom optical system, and a digital apparatus loaded with the image pickup device.

A zoom optical system according to an aspect of the invention at least includes in the order from an object side: a first lens group having a positive optical power; a second lens group having a negative optical power; and a third lens group having a positive optical power. In zooming from a wide angle end to a telephoto end, a distance between the first lens group and the second lens group is increased, and a distance between the second lens group and the third lens group is decreased. The first lens group includes at least one negative lens element, and the second lens group includes a negative lens element closest to the object side, with a lens surface of the negative lens element being concave toward an image side. The zoom optical system satisfies the following conditional expressions (1) and (2):

$$vd_2 < 30 \tag{1}$$

$$50 > vd_{1n} > 30 \tag{2}$$

where $vd_2$ represents the Abbe number of the negative lens element closest to the object side in the second lens group, and $vd_{1n}$ represents an Abbe number of a negative lens element, or an average Abbe number of negative lens elements in the first lens group.

An image pickup device according to another aspect of the invention includes the zoom optical system, and an image sensor, with a light receiving surface, for converting an optical image of a subject into an electrical signal, wherein the zoom optical system is so configured as to form the optical image of the subject on the light receiving surface of the image sensor.

A digital apparatus according to yet another aspect of the invention includes the image pickup device, and a controller for causing the image sensor to perform at least one of a still image photographing operation and a moving image photographing operation of the subject, wherein the zoom optical system is mounted on the image sensor to form the optical image of the subject on the light receiving surface of the image sensor.

These and other objects, features and advantages of the present invention will become more apparent upon reading the following detailed description along with the accompanying drawings.

BRIEF DESCRIPTION OF THE DRAWINGS

FIGS. 2A through 2D are diagrams each showing an external appearance of a digital camera loaded with the zoom optical system of the embodiment of the invention, wherein FIG. 2A is a front view of the digital camera, FIG. 2B is a top plan view of the digital camera, FIG. 2C is a side view of the digital camera, and FIG. 2D is a rear view of the digital camera.

FIG. 4 is a cross-sectional view i.e. an optical path diagram of a zoom optical system in Example 1 at a wide angle end.

FIGS. 5A through 5C are cross-sectional views i.e. optical path diagrams of the zoom optical system in Example 1, wherein FIG. 5A is an optical path diagram of the zoom optical system at the wide angle end, FIG. 5B is an optical path diagram of the zoom optical system at a middle position, and FIG. 5C is an optical path diagram of the zoom optical system at a telephoto end.

FIG. 6 is a cross-sectional view i.e. an optical path diagram of a zoom optical system in Example 2 at a wide angle end.

FIGS. 7A through 7C are cross-sectional views i.e. optical path diagrams of the zoom optical system in Example 2, wherein FIG. 7A is an optical path diagram of the zoom optical system at the wide angle end, FIG. 7B is an optical path diagram of the zoom optical system at a middle position, and FIG. 7C is an optical path diagram of the zoom optical system at a telephoto end.

FIGS. 9A through 9C are cross-sectional views i.e. optical path diagrams of the zoom optical system in Example 3, wherein FIG. 9A is an optical path diagram of the zoom optical system at the wide angle end, FIG. 9B is an optical path diagram of the zoom optical system at a middle position, and FIG. 9C is an optical path diagram of the zoom optical system at a telephoto end.

FIGS. 11A through 11C are cross-sectional views i.e. optical path diagrams of the zoom optical system in Example 4, wherein FIG. 11A is an optical path diagram of the zoom optical system at the wide angle end, FIG. 11B is an optical path diagram of the zoom optical system at a middle position, and FIG. 11C is an optical path diagram of the zoom optical system at a telephoto end.

DETAILED DESCRIPTION OF THE PREFERRED EMBODIMENTS

Figure 1:
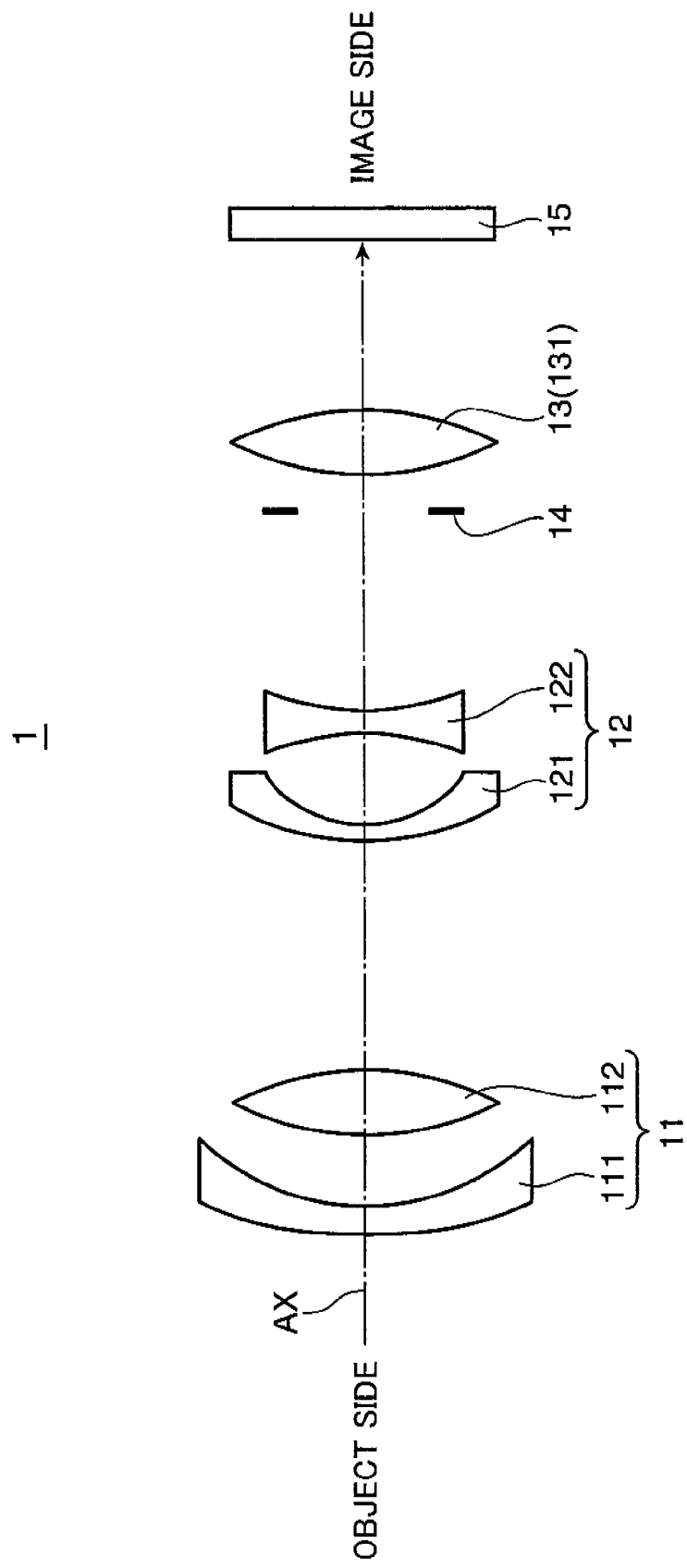
FIG. 1 is a cross-sectional view i.e. an optical path diagram of a zoom optical system embodying the invention.

In the following, an embodiment of the invention is described referring to the drawings. The terms used in the following description are defined as follows throughout the specification.

(a) The refractive index is a refractive index with respect to d-line (wavelength: 587.56 nm).

(b) The Abbe number is an Abbe number vd obtained by the following definitional equation:

$$vd=(nd-1)/(nF-nC)$$

where nd, nF, and nC are refractive indexes with respect to d-line, F-line (wavelength: 486.13 nm), and C-line (wavelength: 656.28 nm) respectively, and vd is the Abbe number.

(c) The indication concerning a plane configuration is an indication based on paraxial curvature.

(d) Concerning lens elements, the indication "concave", "convex", or "meniscus" shows a shape of a lens element near the optical axis i.e. near the center of the lens element, in other words, shows a shape based on paraxial curvature.

Throughout the specification, the symbol "*" indicates multiplication, and the symbol "/" indicates division.

<Description on Arrangement of Zoom Optical System>

FIG. 1 is an optical path diagram schematically showing an arrangement of a zoom optical system 1 embodying the invention. The zoom optical system 1 is a zoom optical system for forming an optical image of a subject on a light receiving surface i.e. an image plane of an image sensor 15 for converting the optical image into an electrical signal. The zoom optical system 1 includes, in the order from the object side, a first lens group 11 having a positive optical power, a second lens group 12 having a negative optical power, and a third lens group 13 having a positive optical power, wherein the distance between the first lens group 11 and the second lens group 12 is increased, and the distance between the second lens group 12 and the third lens group 13 is decreased in zooming from a wide angle end to a telephoto end. The first lens group 11 includes at least one negative lens element, and the second lens group 12 includes a negative lens element closest to the object side, with a lens surface of the negative lens element being concave toward the image side.

In this embodiment, there is described an example, in which the first lens group 11 is constituted of a negative meniscus lens element 111 convex to the object side i.e. at least one negative lens element, and a biconvex positive lens element 112; the second lens group 12 is constituted of a negative meniscus lens element 121 convex to the object side i.e. a negative lens element concave to the image side, and a biconcave negative lens element 122; and the third lens group 13 is constituted merely of a biconvex positive lens element 131. An optical diaphragm 14 i.e. an aperture stop is provided on the object side of the third lens group 13. The image sensor 15 is arranged on the image side of the zoom optical system 1.

In this arrangement, an optical image of a subject located on the object side is guided to a light receiving surface of the image sensor 15 by the zoom optical system 1 with a proper zoom ratio along an optical axis AX, whereby the optical image of the subject is captured by the image sensor 15.

The zoom optical system 1 is a positive-dominant three-component optical system having a positive optical power, a negative optical power, and a positive optical power in this order from the object side. Generally, a negative lens element is disposed in the first lens group 11 having a large on-axis ray height to correct on-axis chromatic aberration at the telephoto end. It is a general practice to use a lens element made of a material having a large refractive index and a low dispersion property, as the negative lens element. Use of the lens element having the above properties enables to efficiently correct on-axis chromatic aberration without unduly increasing the optical power of a lens surface in the first lens group 11. It is desirable that a lens element which plays a primary role in imparting a negative optical power to the second lens group 12 should have a large refractive index, considering the need of a significantly large optical power. It is, however, impossible to use a glass material having an exceedingly large dispersion property, considering chromatic aberration correction. In view of this, generally, a heavy lanthanum flint glass material having a relatively small dispersion property is used.

If a larger zoom ratio is required in the positive-dominant zoom optical system 1, second-order spectra of magnification chromatic aberration in +y direction may remain at the wide angle end, and second-order spectra of magnification chromatic aberration in −y direction may remain at the telephoto end. It is difficult to reduce these second-order spectra by combination of lens elements having an ordinary dispersion property. In view of this, using a lens element made of a material having an anomalous dispersion property out of an ordinary dispersion property is advantageous in reducing the second-order spectra of magnification chromatic aberration.

In the embodiment, the zoom optical system 1 satisfies the following conditional expressions (1) and (2) to desirably correct chromatic aberration even in a large zoom state:

$$vd_2 < 30 \tag{1}$$

$$50 > vd_{1n} > 30 \tag{2}$$

where $vd_2$ represents the Abbe number of the negative lens element closest to the object side in the second lens group 12 i.e. the meniscus lens element 121, and $vd_{1n}$ represents the Abbe number of a negative lens element in the first lens group 11 i.e. the negative meniscus lens element 111 (in the case where the first lens group 11 includes plural negative lens elements, $vd_{1n}$ represents the average Abbe number of the negative lens elements).

Properly defining the dispersion property of the second lens group 12 whose off-axis ray height greatly changes in zooming is effective in controlling magnification chromatic aberration. In particular, the negative lens element closest to the object side in the second lens group 12 has a largest off-axis ray height at the wide angle end, and a lowest on-axis ray height at the telephoto end in a range closer to the object side than the optical diaphragm 14. Accordingly, magnification chromatic aberration at the wide angle end can be controlled while minimizing an influence to the on-axis chromatic aberration at the telephoto end by properly defining the dispersion property of the negative lens element closest to the object side in the second lens group 12.

A lens material having the Abbe number defined by the conditional expression (1) generally shows an anomalous dispersion property that the partial dispersion ratio is "+". Accordingly, as compared with a lens element made of a material having an ordinary dispersion property, use of the aforementioned lens material enables to relatively largely refract light rays in a short wavelength band in −y direction, as compared with light rays in a long wavelength band, thereby enabling to reduce the second-order spectra of magnification chromatic aberration in +y direction at the wide angle end.

Preferably, the negative lens element closest to the object side in the second lens group 12 may satisfy the following conditional expression (10). In the conditional expression (10), hb represents an off-axis ray height on the lens surface closest to the object side in the second lens group 12, and is a value calculated by paraxial approximation in the case where a ray whose tangent of incident angle is 1.0 is incident onto the zoom optical system 1 in a manner that the ray intersects with an optical axis at a diaphragm position, and fw represents a focal length of an entirety of the zoom optical system at the wide angle end.

$$hb/fw \geq 1.5 \tag{10}$$

In the case where the value of hb/fw is below the lower limit in the conditional expression (10), the aforementioned advantage is not sufficiently obtained, because the off-axis ray height is exceedingly lowered.

Chromatic aberration correction by the second lens group 12 may be excessive in correcting on-axis chromatic aberration at the telephoto end by satisfying the conditional expression (1). Specifically, assuming that the focal length of the negative lens element closest to the object side in the second lens group 12 is $f_{2n}$, the focus position of F-line is displaced from that of C-line by $-f_{2n}/vd_2$ by the negative lens element closest to the object side in the second lens group 12. The displacing direction is +direction because $f_{2n} < 0$, and the Abbe number $vd_2$ is decreased. As a result, the displacement amount is increased, which may cause an excessive correction.

On the other hand, assuming that the focal length of the i-th negative lens element in the first lens group 11 is $f_{1ni}$, and the Abbe number of the i-th negative lens element is $vd_{1ni}$, the focus position of F-line is displaced from that of C-line by $\Sigma - f_{1ni}/vd_{1ni}$ by the negative lens element in the first lens group 11. The displacing direction is +direction because $f_{1ni} < 0$. In the case where on-axis chromatic aberration correction by the second lens group 12 is excessive, the excessive correction can be suppressed by reducing the displacement amount, specifically, by controlling the first lens group 11 in such a manner that the value of $vd_{1n}$ is over the lower limit in the conditional expression (2). If, however, the value of $vd_{1n}$ is over the upper limit in the conditional expression (2), chromatic aberration correction by the first lens group 11 may be insufficient, or it is required to increase the optical power of a lens surface of a negative lens element in the first lens group 11, which may degrade aberration such as field curvature.

As described above, chromatic aberration can be desirably corrected even if the zoom optical system 1 is in a large zoom state, by satisfying both of the conditional expressions (1) and (2). This enables to provide a compact zoom lens unit having a large zoom ratio and operable to desirably correct chromatic aberration, without the need of increasing the number of lens elements constituting the optical system, or unduly lowering the refractive powers of the lens elements.

Preferably, the negative lens closest to the object side in the second lens group 12 i.e. the negative meniscus lens element 121 in the zoom optical system 1 may satisfy the following conditional expression (3) in the aspect of advantageously obtaining an effect of suppressing second-order spectra of magnification chromatic aberration at the wide angle end, where $\theta g, F_2$ is a partial dispersion ratio of the negative lens element, assuming that $\theta g, F=(ng-nF)/(nF-nC)$.

$$\theta g, F_2 + 0.001767 * vd_2 - 0.6477 > 0.004 \quad (3)$$

In particular, satisfying the following conditional expression (3a) is more advantageous in reducing second-order spectra of magnification chromatic aberration at the wide angle end.

$$\theta g, F_2 + 0.001767 * vd_2 - 0.6477 > 0.01 \quad (3a)$$

Preferably, the negative lens element in the first lens group 11 in the zoom optical system 1 may satisfy the following conditional expression (4), where $\theta g, F_{1n}$ is an average value of partial dispersion ratio of the negative lens element in the first lens group 11, assuming that $\theta g, F=(ng-nF)/(nF-nC)$.

$$\theta g/F_{1n} + 0.001767 * vd_{1n} - 0.6477 < -0.004 \quad (4)$$

Satisfying the conditional expression (4) reduces the refractive power of the negative lens element in the first lens group 11 with respect to light rays in a short wavelength band, as compared with light rays in a long wavelength band. Thereby, it is possible to eliminate second-order spectra of on-axis chromatic aberration at the telephoto end. It is often the case that a positive-dominant zoom lens unit having a large zoom ratio suffers chromatic aberration of astigmatism at the telephoto end, resulting from a light diffusing surface of the negative lens element in the first lens group 11. The chromatic aberration of astigmatism can be reduced by satisfying the conditional expression (4), because satisfying the conditional expression (4) enables to relatively reduce the refractive power of the first lens group 11 with respect to light rays in a short wavelength band. In particular, satisfying the following conditional expression (4a) is more advantageous in obtaining an effect of reducing second-order spectra of on-axis chromatic aberration, and an effect of reducing chromatic aberration of astigmatism.

$$\theta g/F_{1n} + 0.001767 * vd_{1n} - 0.6477 < -0.006 \quad (4a)$$

Preferably, at least one positive lens element in the first lens group 11 (in the example of FIG. 1, the positive lens element 112) may satisfy the following conditional expression (5), where $\theta g, F_{1p}$ is a partial dispersion ratio of the positive lens element, assuming that $\theta g, F=(ng-nF)/(nF-nC)$.

$$\theta g, F_{1p} + 0.001767 * vd_{1p} - 0.6477 > 0.004 \quad (5)$$

Similarly to the above, second-order spectra of on-axis chromatic aberration at the telephoto end can be further reduced by forming the positive lens element in the first lens group 11 into a lens element having an anomalous dispersion property satisfying the conditional expression (5). In particular, satisfying the following conditional expression (5a) is more advantageous in obtaining an effect of reducing second-order spectra of on-axis chromatic aberration.

$$\theta g, F_{1p} + 0.001767 * vd_{1p} - 0.6477 > 0.01 \quad (5a)$$

Preferably, the zoom optical system 1 may satisfy the following conditional expressions (6) through (8), where f1 represents a focal length of the first lens group 11, f2 represents a focal length of the second lens group 12, f3 represents a focal length of the third lens group 13, fw represents a focal length of the entirety of the zoom optical system 1 at the wide angle end, and ft represents a focal length of the entirety of the zoom optical system 1 at the telephoto end.

$$1.7 < f1/\sqrt{(fw*ft)} < 4.8 \quad (6)$$

$$-0.63 < f2/\sqrt{(fw*ft)} < -0.08 \quad (7)$$

$$0.21 < f3/\sqrt{(fw*ft)} < 1.25 \quad (8)$$

The conditional expression (6) is a conditional expression for defining a ratio of the focal length of the first lens group 11 to the focal length of the entirety of the zoom optical system 1 at a zoom position indicated by $\sqrt{(fw*ft)}$. If the ratio is below the lower limit in the conditional expression (6), the optical power of the first lens group 11 is unduly increased. An increased optical power of the first lens group 11 is preferable in the aspect of miniaturizing the zoom optical system 1. However, the increased optical power of the first lens group 11 increases the aberration amount of the first lens group 11, particularly, causing large field curvature and distortion aberration. It is required to add a lens element or an aspherical surface in order to correct the aberration, which is not preferable. On the other hand, if the ratio is over the upper limit in the conditional expression (6), it is difficult to miniaturize the zoom optical system 1, despite an advantage in correcting the aberration.

The conditional expression (7) is a conditional expression for defining a ratio of the focal length of the second lens group 12 to the focal length of the entirety of the zoom optical system 1 at the zoom position indicated by $\sqrt{(fw*ft)}$. If the ratio is below the lower limit in the conditional expression (7), the optical power of the second lens group 12 is unduly increased. An increased optical power of the second lens group 12 is preferable in the aspect of miniaturizing the zoom optical system 1, because the increased optical power of the second lens group 12 enables to reduce the moving amount thereof in zooming. However, the increased optical power of the second lens group 12 increases the aberration amount thereof, particularly causing large field curvature and distortion aberration It is required to additionally provide a lens element or an aspherical surface in order to correct the aberration, which is not preferable in the aspect of cost or size. On the other hand, if the ratio is over the upper limit in the conditional expression (7), it is difficult to miniaturize the zoom optical system 1, despite an advantage in correcting the aberration.

The conditional expression (8) is a conditional expression for defining a ratio of the focal length of the third lens group 13 to the focal length of the entirety of the zoom optical system 1 at the zoom position indicated by $\sqrt{(fw*ft)}$. If the ratio is below the lower limit in the conditional expression (8), the optical power of the third lens group 13 is unduly increased. An increased optical power of the third lens group 13 is preferable in the aspect of miniaturizing the zoom optical system 1. However, the increased optical power of the third lens group 13 increases the aberration amount thereof, particularly causing large spherical aberration and coma aberration. It is required to additionally provide a lens element or an aspherical surface in order to correct the aberration, which is not preferable in the aspect of cost or size. On the other hand, if the ratio is over the upper limit in the conditional expression (8), it is difficult to miniaturize the zoom optical system 1, despite an advantage in correcting the aberration.

Further preferably, the zoom optical system 1 satisfies the following conditional expression (9).

$$10.0 \leq ft/fw \quad (9)$$

The conditional expression (9) is a conditional expression for defining the zoom ratio of the zoom optical system 1. In the case where the aforementioned lens arrangement is applied to the zoom optical system 1 having such a large zoom ratio as to satisfy the conditional expression (9), specifically, a zoom ratio as large as twenty times or more, magnification chromatic aberration and on-axis chromatic aberration can be sufficiently suppressed, while securing miniaturization, thereby effectively imparting the effects of the embodiment of the invention.

FIG. 1 shows an example, wherein the first lens group 11, the second lens group 12, and the third lens group 13 are arranged in this order from the object side. Alternatively, for instance, the zoom optical system 1 may include other lens group arranged at a position closer to the image side than the third lens group 13 to bring an incident angle of an off-axis ray with respect to the light receiving surface of the image sensor 15 closer to a telecentric state For instance, a fourth lens group having a positive optical power, and a fifth lens group having a positive or negative optical power may be arranged at a position closer to the image side than the third lens group 13. Further alternatively, a fourth lens group having a negative optical power, and a fifth lens group having a positive or negative optical power may be arranged at a position closer to the image side than the third lens group 13.

In the following, materials of the constituent elements of the zoom optical system 1 are described. There is no specific constraint on the material of the lens elements constituting the first through the third lens group 11 through 13. Any optical material such as various glass materials or plastic materials may be used, as far as the optical material satisfies the aforementioned requirements. In the case where a lens element made of a plastic material is used, it is preferable to use a lens element obtained by molding a material, in which particles having a maximum diameter of 30 nm or less, particularly, inorganic particles are dispersed in the plastic material. Use of the plastic lens element is advantageous in minimizing a refractive index change by a temperature change.

Generally, mixing fine particles in a transparent plastic material causes light scattering, which may lower the light transmittance. Accordingly, it is difficult to use a transparent resin material containing fine particles, as an optical material. However, light scattering can be substantially eliminated by setting the size of fine particles smaller than the wavelength of transmitted light rays. The refractive index of a plastic material is lowered, as the temperature rises. However, the refractive index of fine particles of an inorganic material, for instance, is increased, as the temperature rises. In view of this, a refractive index change can be substantially eliminated by utilizing and counteracting the temperature-dependent characteristics of the plastic material and the inorganic material. Specifically, dispersing particles having a maximum diameter of 30 nm or less in a plastic material as a base material enables to produce a resin material having a refractive index whose temperature-dependency is significantly small. For instance, dispersing fine particles of niobium oxide ($Nb_2O_5$) in an acrylic resin enables to suppress a refractive index change by a temperature change. Accordingly, use of a particle-dispersed plastic material for producing at least one lens element is advantageous in minimizing a back focusing distance of the entirety of the zoom optical system 1 in the embodiment of the invention, resulting from an ambient temperature change.

Preferably, the zoom optical system 1 has a mechanical shutter having a function of blocking light from the image sensor 15, in place of the optical diaphragm 14. The mechanical shutter is effective in preventing smear in the case where a CCD (Charge Coupled Device) sensor is used as the image sensor 15, for instance.

A conventional well-known cam mechanism or stepping motor may be used as a drive source for driving the lens groups, the diaphragm, the shutter, or a like member provided in the zoom optical system 1. In the case where the moving amount is small, or the weight of the driving members is light, use of a microminiaturized piezoelectric actuator enables to drive the lens groups independently of each other, while suppressing an increase in the volume of a driver or the electric power consumption. This is advantageous in further miniaturizing an imaging lens device incorporated with the zoom optical system 1

It is preferable to dispose a low-pass filter (not shown) for removing noise components on the light receiving surface of the image sensor 15. Examples of the low-pass filter are a birefringent low-pass filter made of a crystal or a like material, whose predetermined crystal axis direction is regulated, and a phase low-pass filter for obtaining a required optical cutoff frequency characteristic by a diffraction effect. Further alternatively, an infrared cutoff filter may be used to reduce noises included in an image signal from the image sensor 15, in place of the optical low-pass filter. Further alternatively, the function of the birefringent low-pass filter and the function of the phase low-pass filter may be realized by a single low-pass filter by applying an infrared reflective coat to a surface of the optical low-pass filter.

The image sensor 15 is adapted to photoelectrically convert an optical image of a subject captured by the zoom optical system 1 into image signals of color components of R, G, and B in accordance with the light amount of the subject image for outputting the image signals to a predetermined image processing circuit. For instance, the image sensor 15 is a one-chip color area sensor of a so-called "Bayer matrix", in which patches of color filters each in red (R), green (G), and blue (B) are attached in a checkered pattern on respective surfaces of CCDs of the area sensor arrayed in two dimensions. Examples of the image sensor 15 are a CMOS image sensor, and a VMIS image sensor in addition to the CCD image sensor.

<Description on Digital Apparatus Incorporated with Zoom Optical System>

In this section, a digital apparatus incorporated with the zoom optical system 1 having the above arrangement is described. FIGS. 2A through 2D are diagrams each showing an external appearance of a digital camera 2, as an example of the digital apparatus embodying the invention. In this embodiment, the digital apparatus includes a digital still camera, a video camera, a digital video unit, a PDA (Personal Digital Assistant), a personal computer, a mobile computer, and peripheral devices thereof such as a mouse, a scanner, and a printer.

Figure 2C:
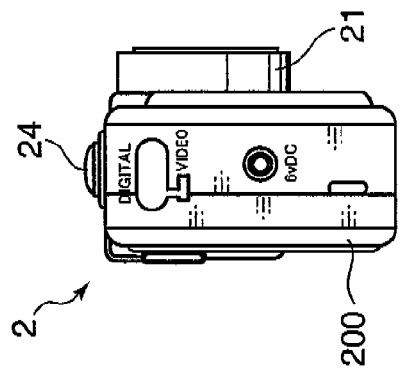
Figure 2D:
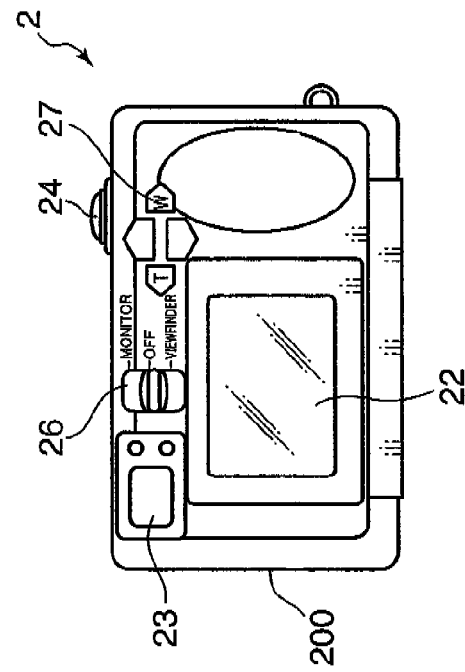
Figure 2A:
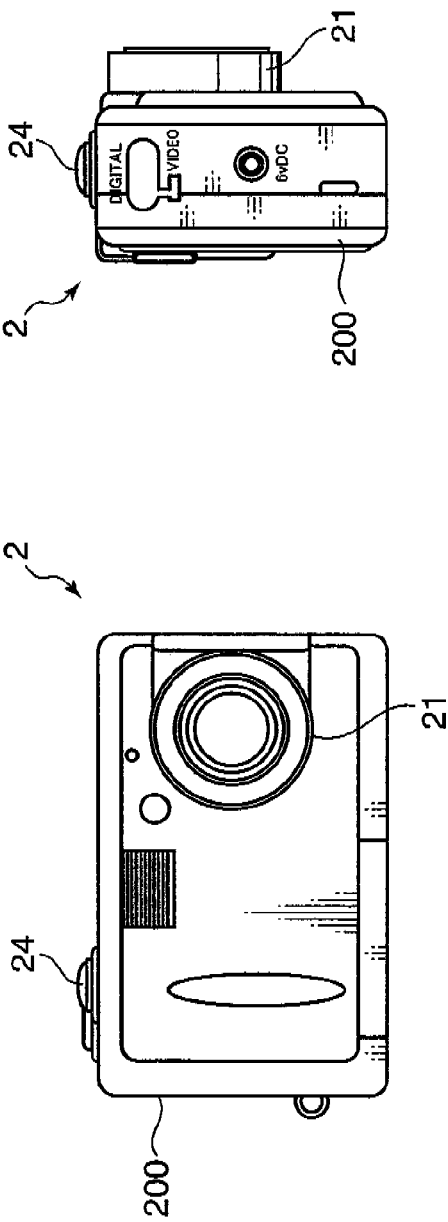
Figure 2B:
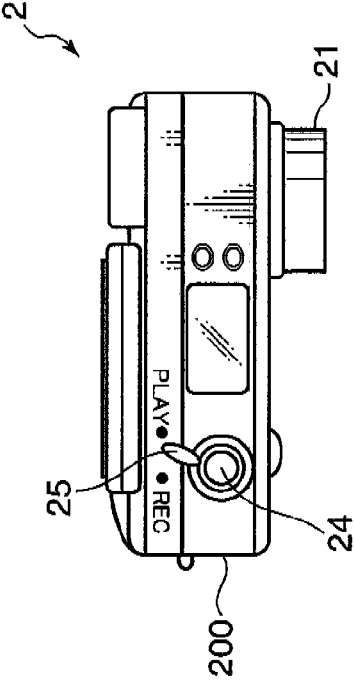

FIG. 2A is a front view of the digital camera 2, FIG. 2B is a top plan view of the digital camera 2, FIG. 2C is a side view of the digital camera 2, and FIG. 2D is a rear view of the digital camera 2. An imaging lens device 21 is provided on the front surface of a camera body 200 of the digital camera 2. The zoom optical system 1 is built in the imaging lens device 21. A display monitor 22 such as an LCD (Liquid Crystal Display), and an electronic viewfinder 23 are provided on the rear surface of the camera body 200. A shutter button 24 for allowing a photographer to designate photographing, and a photographing mode changeover switch 25 for selectively changing over the photographing mode between reproduction mode indicated by PLAY in FIG. 2B and recording mode indicated by REC in FIG. 2B are provided on the top surface of the camera body 200.

A main switch 26 as a slide switch, which functions both as a power on/off switch and a display changeover switch for selectively changing over the display between the electronic viewfinder 23 and the monitor 22, is provided on the rear surface of the camera body 200. A push switch group 27 functioning as a switch for feeding recorded images frame by frame at the reproduction mode, and a zoom switch of the imaging lens device 21 is provided on the right side of the main switch 26. In FIG. 2D, the symbol "T" indicates telephoto, and the symbol "w" indicates wide angle.

Figure 3:
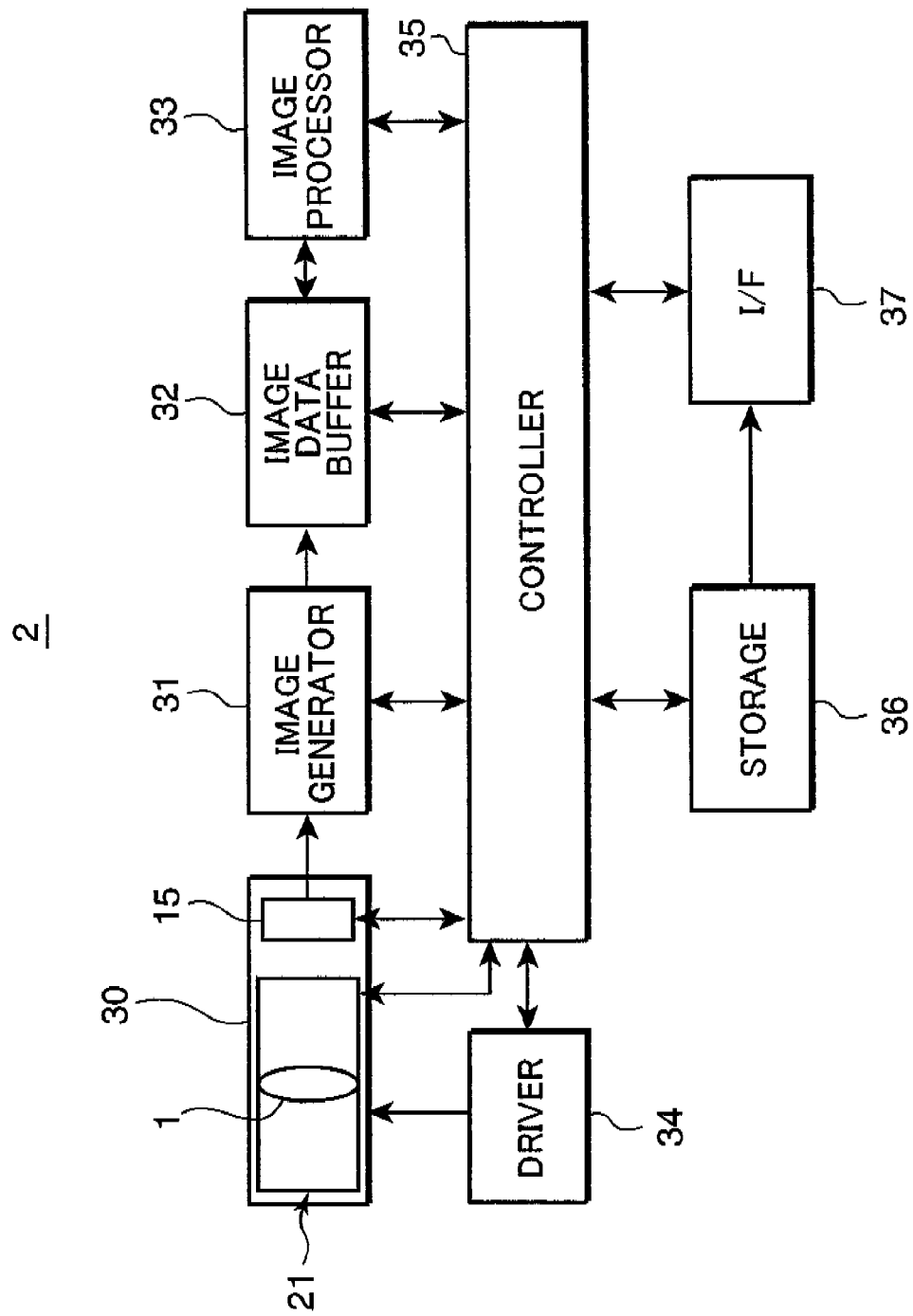
FIG. 3 is a functional block diagram showing a functional configuration of the digital camera, as an example of a digital apparatus incorporated with the zoom optical system of the embodiment of the invention.

FIG. 3 is a functional block diagram showing an electrical configuration on an imaging operation to be performed by the digital camera 2. The digital camera 2 includes an imager 30, an image generator 31, an image data buffer 32, an image processor 33, a driver 34, a controller 35, a storage 36, and an I/F (interface) 37.

The imager 30 includes the imaging lens device 21, as an image pickup device, and the image sensor 15. The imaging lens device 21 has the zoom optical system 1 as shown in FIG. 1, and an unillustrated lens driver for driving the lens groups in the optical axis direction for zooming and focusing. Light rays from a subject are focused on the light receiving surface of the image sensor 15 by the zoom optical system 1 to form an optical image of the subject.

The image sensor 15 converts the optical image of the subject formed by the zoom optical system 1 into electric signals of color components of R (red), G (green), and B (blue) for outputting the electric signals to the image generator 31 as image signals of the colors of R, G, and B. The image sensor 15 is operative to perform an imaging operation such as one of a still image sensing operation and a moving image sensing operation, or a readout operation (horizontal scanning, vertical scanning, transfer) of an output signal from each pixel in the image sensor 15 under the control of the controller 35.

The image generator 31 performs amplification, digital conversion, or a like processing with respect to an analog output signal from the image sensor 15; and performs well-known image processing such as determination of proper black level with respect to the entirety of the image, gamma correction, white balance (WB) adjustment, contour correction, and color disparity correction to generate image data of each pixel based on the image signal. The image data generated by the image generator 31 is outputted to the image data buffer 32.

The image data buffer 32 temporarily stores image data, and is a memory to be used as a work area for allowing the image processor 33 to perform the following processing with respect to the image data. The image data buffer 32 includes e.g. an RAM (Random Access Memory). The image processor 33 is a circuit for performing image processing such as resolution conversion with respect to the image data temporarily stored in the image data buffer 32. The image processor 33 may be so configured as to correct aberration that has not been corrected by the zoom optical system 1, according to needs. The driver 34 drives the lens groups of the zoom optical system 1 in such a manner that intended zooming and focusing are performed based on a control signal to be outputted from the controller 35.

The controller 35 includes e.g. a microprocessor, and controls respective operations of the imager 30, the image generator 31, the image data buffer 32, the image processor 33, the driver 34, the storage 36, and the I/F 37. Specifically, the controller 35 controls the imaging lens device 21 and the image sensor 15 to perform at least one of a still image photographing operation and a moving image photographing operation of a subject.

The storage 36 is a memory circuit for storing the image data generated by the still image photographing operation or the moving image photographing operation of the subject. The storage 36 includes e.g. an ROM (Read Only Memory) or an RAM. In other words, the storage 36 has a function as a memory for a still image photographing operation or a moving image photographing operation. The I/F 37 is an interface for transmitting and receiving image data to and from an external device. The I/F 37 is an interface in conformity with the standards e.g. USB or IEEE1394.

As an exemplified operation to be executed by the digital camera 2 having the above arrangement, a still image sensing operation is described. First, the controller 35 drives the unillustrated lens driver in the imaging lens device 21 for focusing. Thereby, an optical image of the subject in a focus state is formed on the light receiving surface of the image sensor 15 for conversion into image signals of color components of R, G, and B. Thereafter, the image signals are outputted to the image generator 31. The image signals are temporarily stored in the image data buffer 32 for image processing in the image processor 33. After the image processing, the processed image data is transferred to a memory (not shown) for display so that the image data is displayed on the monitor 22 as a subject image. When the photographer depresses the shutter button 24 in this state, a still image can be captured. In other words, image data is stored in the storage 36 as a memory for a still image sensing operation.

In the above operation, if the photographer wishes to perform zooming, because the subject is located away from the photographer, or the photographer wishes to obtain an enlarged image of the subject nearby, the photographer depresses the portion "T" of the push switch group 27 serving as a zoom button. Then, the controller 35 is operative to drive the lens groups for zooming in accordance with a depressed time, thereby causing the zoom optical system 1 to zoom in the image. If the photographer wishes to reduce the magnification of the subject image because of excessive zooming or a like condition, the photographer depresses the portion "W" of the push switch group 27. Then, the controller 35 is operative to drive the lens groups to zoom toward the wide angle end. In this way, the photographer is allowed to adjust the magnification by using the zoom button, even if the subject is away from the photographer. Similarly to normal photographing with the same magnification, an enlarged still image can be captured by adjusting the position of the displayed image in such a manner that the main subject image is located in an intended position within the display screen of the monitor 22, and by depressing the shutter button 24 in this state.

DESCRIPTION ON EXAMPLES OF ZOOM OPTICAL SYSTEM

In the following, examples of the zoom optical system 1 as shown in FIG. 1, specifically, the zoom optical system 1 to be built in the imaging lens device 21 to be loaded in the digital camera 2, as shown in FIGS. 2A through 2D, are described referring to the drawings.

Example 1

Figure 5A:
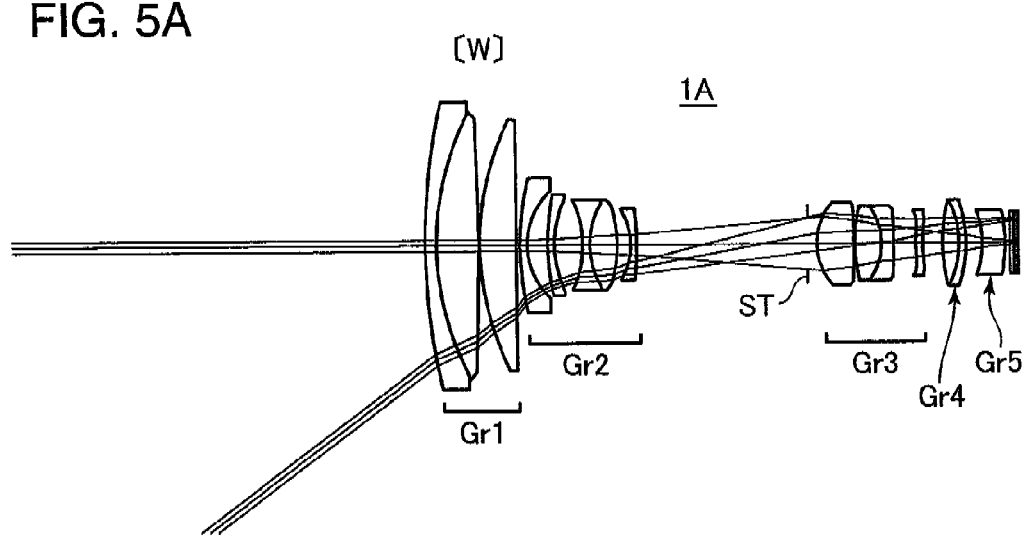
Figure 5B:
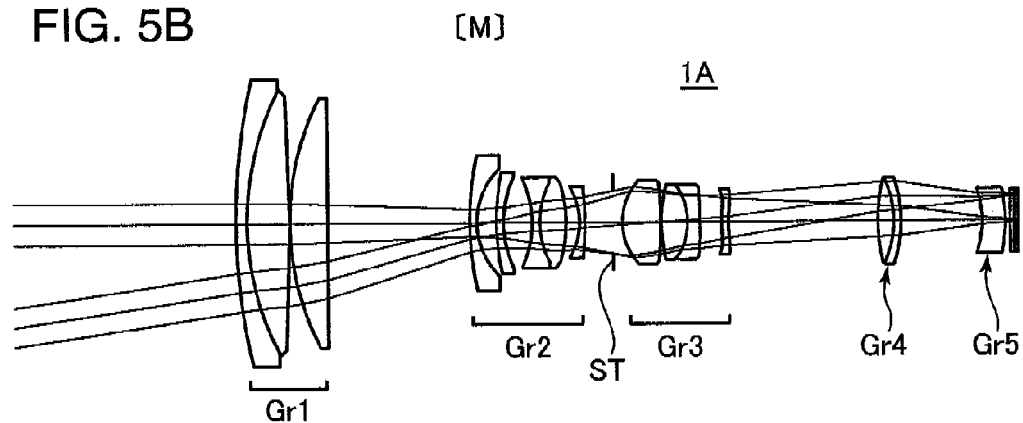
Figure 5C:
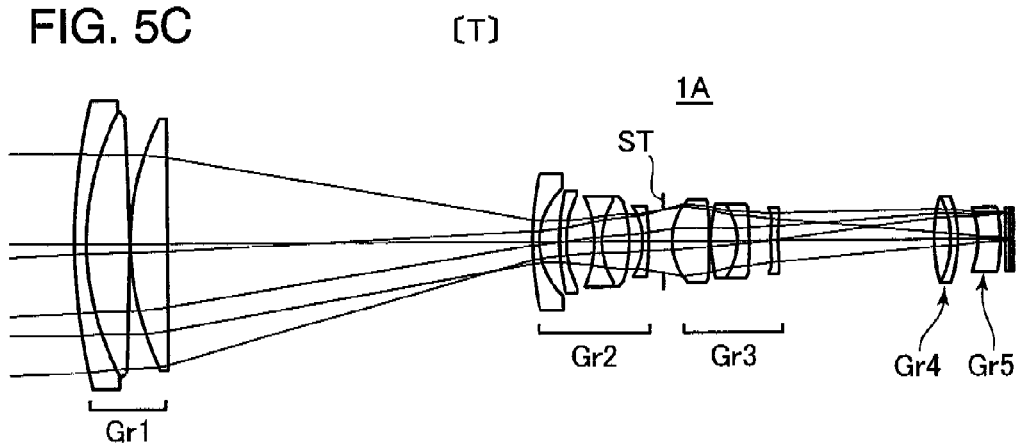

FIG. 4, and FIGS. 5A through 5C are cross-sectional views i.e. optical path diagrams each showing an arrangement of lens groups in a zoom optical system 1A in Example 1, taken along the optical axis (AX). The optical path diagram of FIG. 4 shows a lens arrangement of the zoom optical system 1A at a wide angle end (W). The optical path diagrams of FIGS. 5A through 5C each shows a zoom operation to be performed by the zoom optical system 1A, wherein FIG. 5A shows a lens arrangement at the wide angle end [W], FIG. 5B shows a lens arrangement at a middle position [M], and FIG. 5C shows a lens arrangement at a telephoto end [T], respectively. The same definition is also applied to the optical path diagrams of FIGS. 6 through 11C.

The zoom optical system 1A in Example 1 is a five-component zoom system having a positive-negative-positive-positive-negative arrangement, which includes, in this order from the object side, a first lens group (Gr1) having a positive optical power as a whole, a second lens group (Gr2) having a negative optical power as a whole, an aperture stop (ST), a third lens group (Gr3) having a positive optical power as a whole, a fourth lens group (Gr4) having a positive optical power as a whole, and a fifth lens group (Gr5) having a negative optical power. As shown in FIGS. 5A through 5C, the first lens group (Gr1), the second lens group (Gr2), the third lens group (Gr3), and the fourth lens group (Gr4) are moved independently of each other in zooming.

More specifically, each of the lens groups in the zoom optical system 1A in Example 1 has the following arrangement in this order from the object side, as shown in FIG. 4. The first lens group (Gr1) is constituted of a negative meniscus lens element (first lens element L1) convex to the object side, a biconvex positive lens element (second lens element L2), and a positive meniscus lens element (third lens element L3) convex to the object side. The first lens element L1 and the second lens element L2 constitute a cemented lens element. The second lens group (Gr2) is constituted of a negative meniscus lens element (fourth lens element L4) convex to the object side, a negative meniscus lens element (fifth lens element L5) convex to the object side, a biconcave negative lens element (sixth lens element L6), a biconvex positive lens element (seventh lens element L7), and a negative meniscus lens element (eighth lens element L8) convex to the image side. The sixth lens element L6 and the seventh lens element L7 constitute a cemented lens element.

The third lens group (Gr3) is constituted of a biconvex positive lens element (ninth lens element L9), a biconvex positive lens element (tenth lens element L10), a negative meniscus lens element convex to the image side (eleventh lens element L11), and a negative meniscus lens element (twelfth lens element L12) convex to the object side. The aperture stop (ST) movable with the third lens group (Gr3) in zooming is provided on the object side of the third lens group (Gr3). The fourth lens group (Gr4) is constituted of a cemented lens element made of a biconvex positive lens element (thirteenth lens element L13), and a negative meniscus lens element (fourteenth lens element L14) convex to the image side. The fifth lens group (Gr5) is constituted of a single negative meniscus lens element (fifteenth lens element L15) convex to the image side. A light receiving surface of an image sensor (SR) is arranged on the image side of the fifth lens group (Gr5) via a plane parallel plate (FT) constituted of an optical low-pass filter, an infrared cutoff filter, or a like member, and a cover glass (CG). Alternatively, a mechanical shutter may be provided in place of the aperture stop (ST). The modification is also applied to Examples 2 through 4.

Referring to FIG. 4, the surface attached with the symbol ri (i=1, 2, 3, ... ) indicates the i-th lens surface from the object side (a cemented surface of a cemented lens element is counted as a lens surface), and the surface ri attached with an asterisk (*) indicates an aspherical surface. The aperture stop (ST), both surfaces of the plane parallel plate (FT), both surfaces of the cover glass (CG), and the light receiving surface of the image sensor (SR) are each regarded as one lens surface. The same definition is also applied to the optical path diagrams (see FIGS. 6, 8, and 10) concerning Examples 2, 3, and 4 to be described later, and the symbols in FIGS. 6, 8, and 10 identical to those in FIG. 4 have basically the same meaning as in FIG. 4. The above description, however, does not mean that all the identical symbols indicate the same element. For instance, although the identical symbol (ri) is attached to the lens surface closest to the object side throughout the drawings of FIGS. 4, 6, and 8, this does not mean that the curvatures or a like feature of the lens surfaces attached with the symbol (ri) are identical throughout Examples.

In the above arrangement, an incident ray from the object side is transmitted through the first lens group (Gr1), the second lens group (Gr2), the third lens group (Gr3), the fourth lens group (Gr4), the fifth lens group (Gr5), the parallel plane plate (FT), and the cover glass (CG) in this order along the optical axis AX, and forms an optical image of the object on the light receiving surface of the image sensor (SR). Then, the image sensor (SR) converts the optical image corrected by the parallel plane plate (FT) into an electric signal. The electric signal is subjected to a predetermined processing such as digital image processing or image compression processing, according to needs. Thereafter, the processed signal is recorded in a memory of a digital camera, a mobile phone, or a like device, as a digital video signal, or transmitted to other digital apparatus wiredly or wirelessly.

As shown in FIG. 5, the zoom optical system 1A in Example 1 is moved in such a manner that in zooming from the wide angle end (W) to the telephoto end (T), the first lens group (Gr1) is linearly moved toward the object side; and the second lens group (Gr2), the third lens group (Gr3), and the fourth lens group (Gr4) are moved in such a manner that the trajectory thereof is convex toward the object side. The fifth lens group (Gr5) is unmoved in zooming. Also, in zooming, the distance between the first lens group (Gr1) and the second lens group (Gr2) is increased, and the distance between the second lens group (Gr2) and the third lens group (Gr3) is decreased.

Construction data concerning the lens elements in the zoom optical system 1A in Example 1 are shown in the following.

Numerical Data in Example 1

| lens surface No. | r | d | nd | vd | θg, F |
|---|---|---|---|---|---|
| object plane | ∞ | ∞ | | | |
| 1 | 90.885 | 1.600 | 1.88300 | 40.8 | 0.5652 |
| 2 | 40.775 | 6.145 | 1.48749 | 70.5 | 0.5303 |
| 3 | −339.265 | 0.116 | | | |
| 4 | 40.149 | 5.101 | 1.49700 | 81.6 | 0.5386 |
| 5 | 1012.770 | variable | | | |
| 6 | 44.169 | 1.000 | 1.92286 | 20.9 | 0.6391 |
| 7 | 10.644 | 2.881 | | | |
| 8 | 31.886 | 1.000 | 1.81359 | 25.7 | 0.6161 |
| 9* | 15.317 | 4.140 | | | |
| 10 | −15.530 | 0.958 | 1.58913 | 61.2 | 0.5395 |
| 11 | 11.698 | 3.933 | 1.84666 | 23.8 | 0.6191 |
| 12 | −20.461 | 1.937 | | | |
| 13 | −10.109 | 0.800 | 1.62041 | 60.4 | 0.5399 |
| 14 | −44.781 | variable | | | |
| 15 | ∞ | 1.300 | | | |
| (aperture stop) | | | | | |
| 16* | 8.871 | 5.461 | 1.58913 | 61.2 | 0.5374 |
| 17 | −84.116 | 0.100 | | | |
| 18 | 21.647 | 3.855 | 1.49700 | 81.6 | 0.5386 |
| 19 | −8.074 | 1.724 | 1.90366 | 31.3 | 0.5946 |
| 20 | −96.076 | 3.017 | | | |
| 21* | 21.691 | 1.006 | 1.53048 | 55.7 | 0.5672 |
| 22* | 16.669 | variable | | | |
| 23 | 24.330 | 2.363 | 1.51680 | 64.2 | 0.5342 |
| 24 | −14.680 | 1.000 | 1.92286 | 20.9 | 0.6391 |
| 25 | −20.026 | variable | | | |
| 26* | −11.691 | 3.240 | 1.60280 | 28.3 | 0.5948 |
| 27* | −13.135 | 0.638 | | | |

Unit: mm
Lens surface data

-continued

| 28 | ∞ | 0.600 | 1.51680 | 64.2 | 0.5342 |
|---|---|---|---|---|---|
| 29 | ∞ | 0.100 | | | |
| 30 | ∞ | 0.500 | 1.51680 | 64.2 | 0.5342 |
| 31 (image plane) | ∞ | 0.000 | | | |

Aspherical surface data 9-th surface

K = 0.000, A4 = −2.9599E−05, A6 = −2.0934E−07, A8 = 1.2905E−08, A10 = −1.9668E−10

16th surface

K = 0.000, A4 = −4.3720E−05, A6 = 2.4344E−07, A8 = −8.2591E−09, A10 = 1.7966E−10

21st surface

K = 0.000, A4 = −1.3146E−03, A6 = −2.1307E−05, A8 = −2.4625E−07, A10 = 1.3891E−08

22nd surface

K = 0.000, A4 = −9.4885E−04, A6 = −1.8721E−05, A8 = 2.7312E−07, A10 = 9.7397E−09

26th surface

K = 0.000, A4 = 4.3938E−04, A6 = 2.1699E−05, A8 = −2.1102E−06, A10 = 4.4565E−08

27th surface

K = 0.000, A4 = 1.4909E−03, A6 = −3.2757E−05, A8 = −5.8581E−07, A10 = 1.7089E−08

Various data

| zoom ratio | | 23.959 | |
|---|---|---|---|
| | wide angle end | middle | telephoto end |
| focal length | 4.801 | 23.517 | 115.032 |
| F-number | 2.880 | 4.013 | 4.422 |
| half angle of view | 76.789 | 17.082 | 3.483 |
| image height | 3.600 | 3.600 | 3.600 |
| entire lens unit length | 85.284 | 112.431 | 135.006 |
| BF | 0.606 | 0.604 | 0.616 |
| d5 | 0.700 | 20.491 | 52.706 |
| d14 | 24.421 | 3.905 | 2.000 |
| d22 | 2.839 | 21.513 | 22.431 |
| d25 | 2.200 | 11.400 | 2.736 |

Zoom lens group data

| group | 1st lens surface | focal length |
|---|---|---|
| 1 | 1 | 75.039 |
| 2 | 6 | −7.333 |
| 3 | 16 | 15.047 |
| 4 | 23 | 25.520 |
| 5 | 26 | −1130.423 |

In the aforementioned lens surface data, the lens surface No. corresponds to the number "i" in the symbol ri (i=1, 2, 3, . . . ) attached to each of the lens surfaces shown in FIG. 4. The surface attached with an asterisk "*" to the number "i" indicates an aspherical surface, namely, a refractive optical plane of an aspherical configuration or a plane having a refractive power substantially equivalent to that of an aspherical plane. The symbol "r" indicates a curvature radius (unit: mm) of each lens surface. The symbol "d" indicates a distance (on-axis surface distance) between the lens surfaces in the optical axis direction in an infinite focal state. The symbol "nd" indicates a refractive index, the symbol "vd" indicates the Abbe number, and the symbol "θg, F" indicates a partial dispersion ratio of each lens surface, respectively. Since the aperture stop (ST), both surfaces of the plane parallel plate (FT), both surfaces of the cover glass (CG), and the light receiving surface of the image sensor (SR) are flat, respective radii of curvature thereof are infinite ∞.

The aspherical surface data shows the value of conical coefficient K of each surface defined as an aspherical surface i.e. the surface attached with the asterisk "*" to the number "i" in the lens surface data, and the values of aspherical coefficients A4, A6, A8, and A10. The aspherical configuration of the optical plane is defined by the following conditional expression (11), wherein a vertex on the lens surface is represented as the point of origin, and a local orthogonal coordinate system (x, y, z) is used, with the direction from the object toward the image sensor being the plus direction of z-axis.

$$z = \frac{ch^2}{1 + \sqrt{1 - (1+k)c^2h^2}} + A4 \cdot h^4 + A6 \cdot h^6 + A8 \cdot h^8 + A10 \cdot h^{10} \quad (11)$$

where z is a z-axis displacement at the height position h relative to the vertex on the lens surface, h is a height in a direction perpendicular to z-axis ($h^2=x^2+y^2$), c is a paraxial curvature (=1/radius of curvature), A4, A6, A8, and A10 are aspherical coefficients of 4th, 6th, 8th, and 10th orders, respectively, and k is a conical coefficient.

Figure 12:
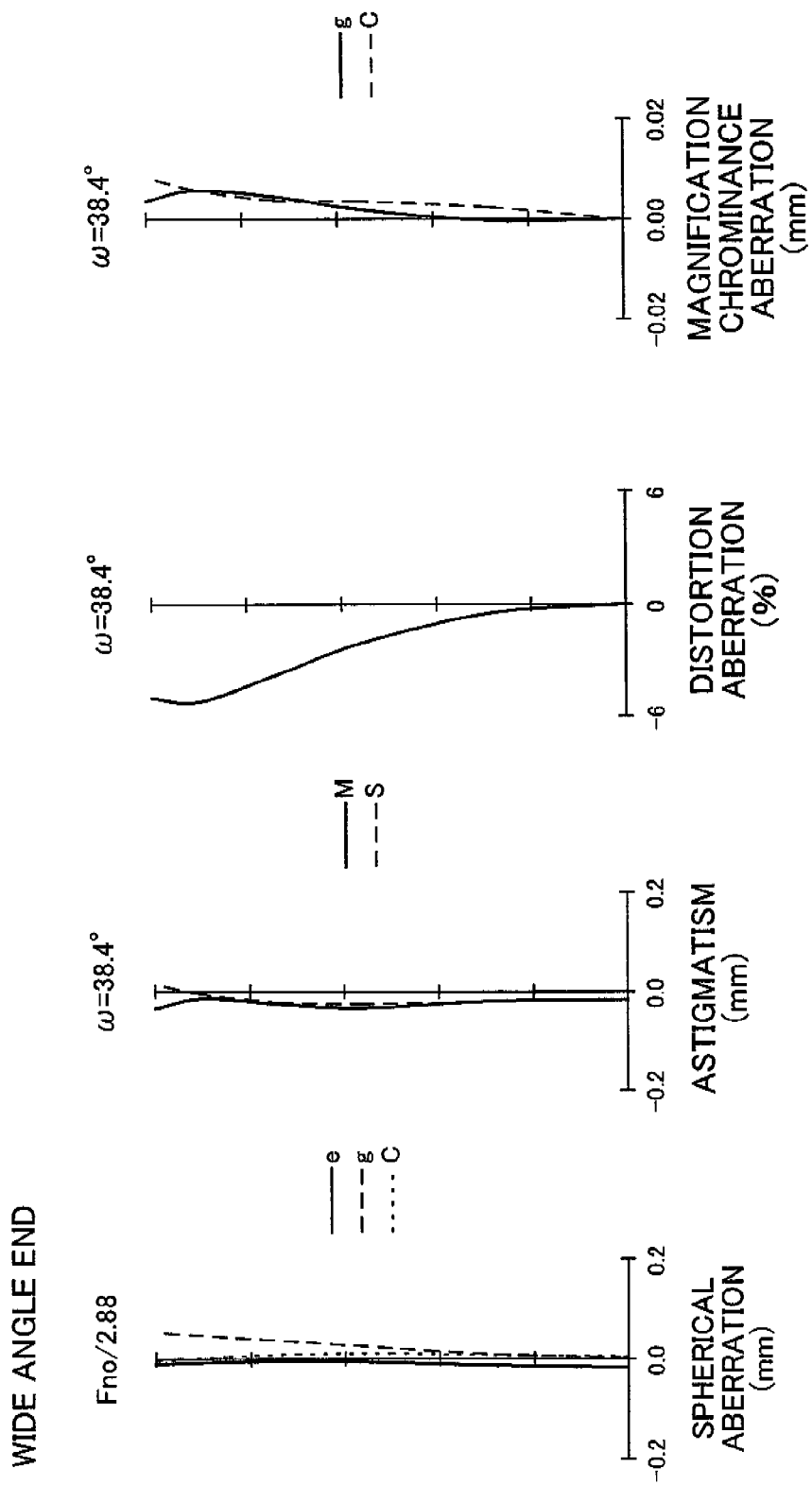
FIG. 12 is aberration diagrams of lens groups in Example 1 at the wide angle end.
Figure 13:
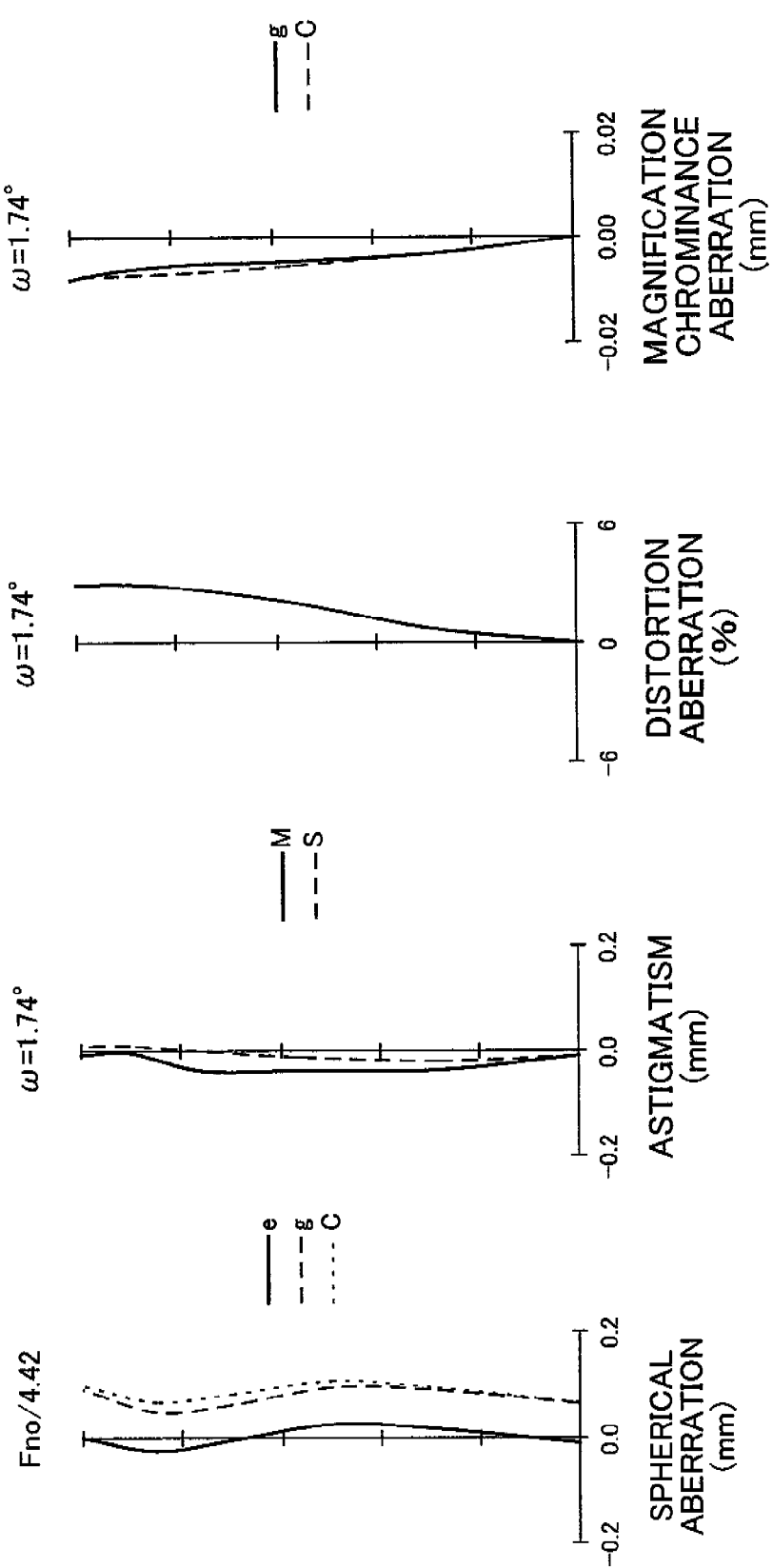
FIG. 13 is aberration diagrams of lens groups in Example 1 at the telephoto end.

Spherical aberration, astigmatism, distortion aberration, and magnification chromatic aberration of the zoom optical system 1A in Example 1 having the above lens arrangement and construction are shown in FIGS. 12 and 13. FIG. 12 shows the aberrations at the wide angle end [W], and FIG. 13 shows the aberrations at the telephoto end [T]. Each of the horizontal axes in the spherical aberration diagrams, the astigmatism diagrams, and the magnification chromatic aberration diagrams shows a focal point displacement in the unit of mm. Each of the horizontal axes in the distortion aberration diagrams shows a distortion with respect to the entire image in terms of percentage. Each of the vertical axes in the spherical aberration diagrams shows a value standardized by the incident height. Each of the vertical axes in the astigmatism diagrams, the distortion aberration diagrams, and the magnification chromatic aberration diagrams shows an angle of view in the unit of degree.

In each of the spherical aberration diagrams, the solid line "e" represents spherical aberration in using e-line (wavelength: 546.07 nm), the coarse broken line "g" represents spherical aberration in using g-line (wavelength: 435.84 nm), and the fine broken line "C" represents spherical aberration in using C-line (wavelength: 656.28 nm). In each of the astigmatism diagrams, the solid line "M" and the broken line "S" represent displacement results on a tangential (meridional) plane and a sagittal (radial) plane, respectively. The astigmatism diagrams and the distortion aberration diagrams show displacement results in using e-line (wavelength: 546.07 nm). In each of the magnification chromatic aberration diagrams, the solid line "g" and the broken line "C" represent aberration in using g-line (wavelength: 435.84 nm) and C-line (wavelength: 656.28 nm), respectively. The above definition is also applied to construction data concerning Examples 2 through 4, and FIGS. 14 through 19 showing aberrations in Examples 2 through 4.

Example 2

Figure 7A:
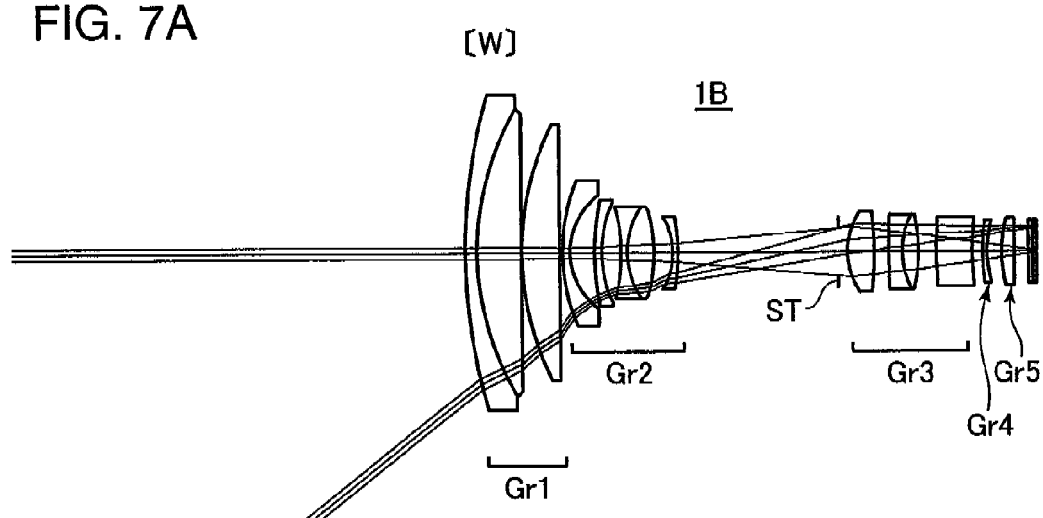
Figure 7B:
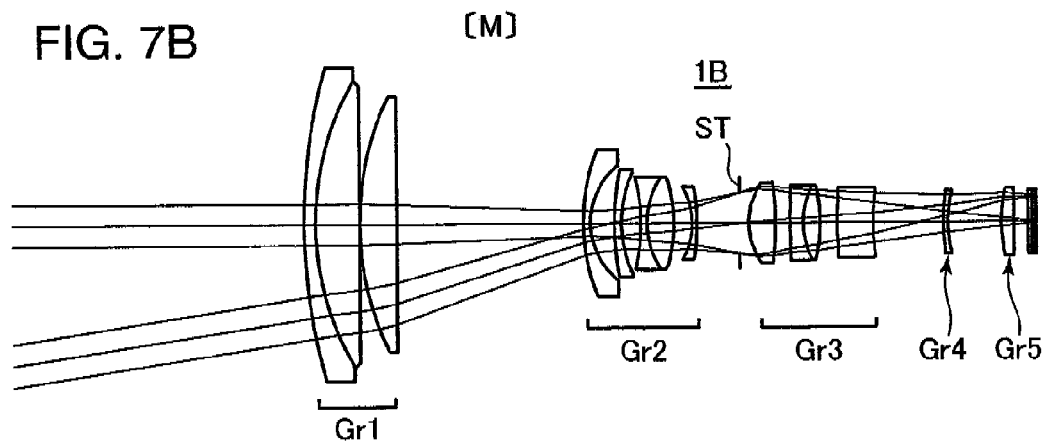
Figure 7C:
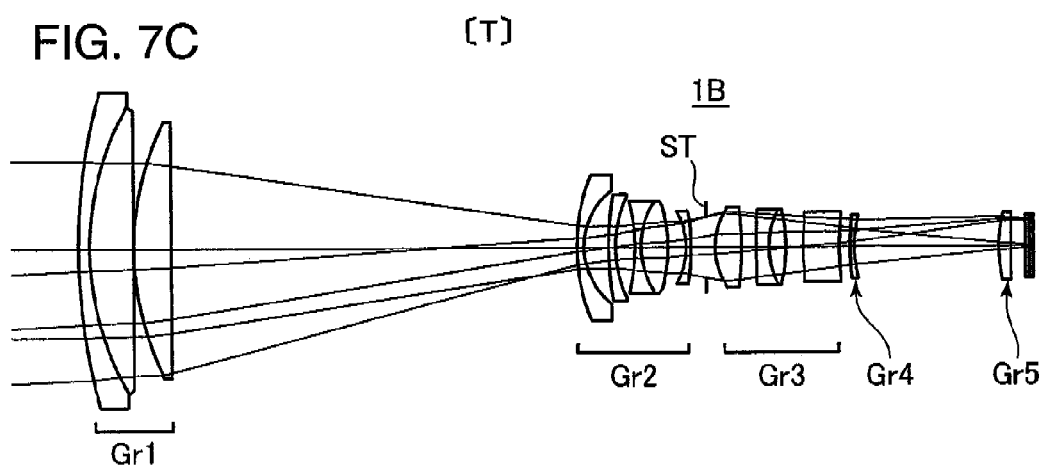

FIGS. 6, and 7A through 7C are cross-sectional views taken along the optical axis (AX), each showing an arrangement of lens groups in a zoom optical system 1B in Example 2. The zoom optical system 1B in Example 2 is a five-component zoom system having a positive-negative-positive-negative-positive arrangement, which includes, in this order from the object side, a first lens group (Gr1) having a positive optical power as a whole, a second lens group (Gr2) having a negative optical power as a whole, an aperture stop (ST), a third lens group (Gr3) having a positive optical power as a whole, a fourth lens group (Gr4) having a negative optical power, and a fifth lens group (Gr5) having a positive optical power. As shown in FIGS. 7A through 7C, the first lens group (Gr1) through the fourth lens group (Gr4) are moved independently of each other in zooming.

More specifically, each of the lens groups in the zoom optical system 1B in Example 2 has the following arrangement in the order from the object side, as shown in FIG. 6. The first lens group (Gr1) is constituted of a negative meniscus lens element (first lens element L1) convex to the object side, a biconvex positive lens element (second lens element L2), and a positive meniscus lens element (third lens element L3) convex to the object side. The first lens element L1 and the second lens element L2 constitute a cemented lens element. The second lens group (Gr2) is constituted of a negative meniscus lens element (fourth lens element L4) convex to the object side, a negative meniscus lens element (fifth lens element L5) convex to the object side, a biconcave negative lens element (sixth lens element L6), a biconvex positive lens element (seventh lens element L7), and a negative meniscus lens element (eighth lens element L8) convex to the image side. The sixth lens element L6 and the seventh lens element L7 constitute a cemented lens element.

The third lens group (Gr3) is constituted of a biconvex positive lens element (ninth lens element L9), a negative meniscus lens element (tenth lens element L10) convex to the object side, a biconvex lens element (eleventh lens element L11), and a positive meniscus lens element (twelfth lens element L12) convex to the object side. The tenth lens element L10 and the eleventh lens element L11 constitute a cemented lens element. An aperture stop (ST) movable with the third lens group (Gr3) in zooming is provided on the object side of the third lens group (Gr3). The fourth lens group (Gr4) is constituted of a single negative meniscus lens element (thirteenth lens element L13) convex to the object side. The fifth lens group (Gr5) is constituted of a single positive meniscus lens element (fourteenth lens element L14) convex to the object side. A light receiving surface of an image sensor (SR) is provided on the image side of the fifth lens group (Gr5) via a parallel plane plate (FT) and a cover glass (CG).

As shown in FIGS. 7A through 7C, in the zoom optical system 1B in Example 2, in zooming from the wide angle end [W] to the telephoto end [T], the first lens group (Gr1), the third lens group (Gr3), and the fourth lens group (Gr4) are moved toward the object side, and the second lens group (Gr2) is moved in such a manner that the trajectory thereof is slightly convex toward the image side. The fifth lens group (Gr5) is unmoved in zooming. Also, in zooming, the distance between the first lens group (Gr1) and the second lens group (Gr2) is increased, and the distance between the second lens group (Gr2) and the third lens group (Gr3) is decreased.

Construction data concerning the lens elements in the zoom optical system 1B in Example 2 are shown in the following.

Numerical Data in Example 2

| lens surface No. | r | d | nd | vd | θg, F |
|---|---|---|---|---|---|
| object plane | ∞ | ∞ | | | |
| 1 | 81.747 | 1.600 | 1.88300 | 40.8 | 0.5652 |
| 2 | 39.993 | 6.157 | 1.48749 | 70.5 | 0.5303 |
| 3 | −38695.242 | 0.100 | | | |
| 4 | 40.756 | 4.893 | 1.49700 | 81.6 | 0.5386 |
| 5 | 544.482 | variable | | | |
| 6 | 27.433 | 1.015 | 1.92286 | 20.9 | 0.6391 |
| 7 | 10.217 | 3.420 | | | |
| 8 | 38.545 | 1.020 | 1.90366 | 31.3 | 0.5946 |
| 9 | 16.192 | 2.823 | | | |
| 10 | −26.078 | 0.800 | 1.75700 | 47.7 | 0.5555 |
| 11 | 11.485 | 3.830 | 1.92286 | 20.9 | 0.6391 |
| 12 | −24.620 | 2.560 | | | |
| 13* | −9.701 | 0.800 | 1.69350 | 53.2 | 0.5464 |
| 14 | −31.564 | variable | | | |
| 15 (aperture stop) | ∞ | 1.300 | | | |
| 16* | 9.226 | 3.890 | 1.58913 | 61.2 | 0.5374 |
| 17 | −58.849 | 1.991 | | | |
| 18 | 195.188 | 1.817 | 1.80518 | 25.5 | 0.6156 |
| 19 | 11.236 | 2.437 | 1.49700 | 81.6 | 0.5386 |
| 20 | −24.672 | 2.338 | | | |
| 21* | 22.369 | 5.052 | 1.53048 | 55.7 | 0.5672 |
| 22* | 23.590 | variable | | | |
| 23* | 39.555 | 0.617 | 1.53048 | 55.7 | 0.5672 |
| 24* | 17.929 | variable | | | |
| 25 | 19.130 | 1.723 | 1.54814 | 45.8 | 0.5702 |
| 26 | 1213.160 | 2.008 | | | |
| 27 | ∞ | 0.600 | 1.51680 | 64.2 | 0.5342 |
| 28 | ∞ | 0.100 | | | |
| 29 | ∞ | 0.500 | 1.51680 | 64.2 | 0.5342 |
| 30 | ∞ | 0.000 | | | |
| (image plane) | | | | | |

Aspherical surface data

13th surface

K = 0.000, A4 = 5.2401E−05, A6 = −6.8147E−07, A8 = 4.9230E−08, A10 = −7.9254E−10

16th surface

K = 0.000, A4 = −1.4397E−04, A6 = −4.9165E−07, A8 = −1.5460E−08, A10 = 1.0397E−11

21st surface

K = 0.000, A4 = −5.1585E−04, A6 = −7.5192E−06, A8 = −3.0845E−08, A10 = 5.6477E−10

22nd surface

K = 0.000, A4 = −3.3634E−04, A6 = −6.7390E−06, A8 = 2.7337E−07, A10 = −2.6726E−09

23rd surface

K = 0.000, A4 = 7.5444E−05, A6 = −5.1330E−06, A8 = 6.5022E−07, A10 = −3.0721E−08

24th surface

K = 0.000, A4 = 9.1420E−05, A6 = −6.0334E−06, A8 = 7.4282E−07, A10 = −3.5901E−08

Various data

| zoom ratio | 23.955 | | |
|---|---|---|---|
| | wide angle end | middle | telephoto end |
| focal length | 4.582 | 22.435 | 109.760 |
| F-number | 2.880 | 3.878 | 4.422 |
| half angle of view | 78.970 | 17.887 | 3.704 |
| image height | 3.600 | 3.600 | 3.600 |
| entire lens unit length | 80.956 | 103.648 | 135.001 |

-continued

| | | | |
|---|---|---|---|
| BF | 0.607 | 0.601 | 0.601 |
| d5 | 0.740 | 26.284 | 57.152 |
| d14 | 22.616 | 5.936 | 2.000 |
| d22 | 1.534 | 9.878 | 1.533 |
| d24 | 2.070 | 7.559 | 20.326 |

Zoom lens group data

| group | 1st lens surface | focal length |
|---|---|---|
| 1 | 1 | 82.073 |
| 2 | 6 | −7.179 |
| 3 | 16 | 13.344 |
| 4 | 23 | −62.436 |
| 5 | 25 | 35.440 |

Figure 14:
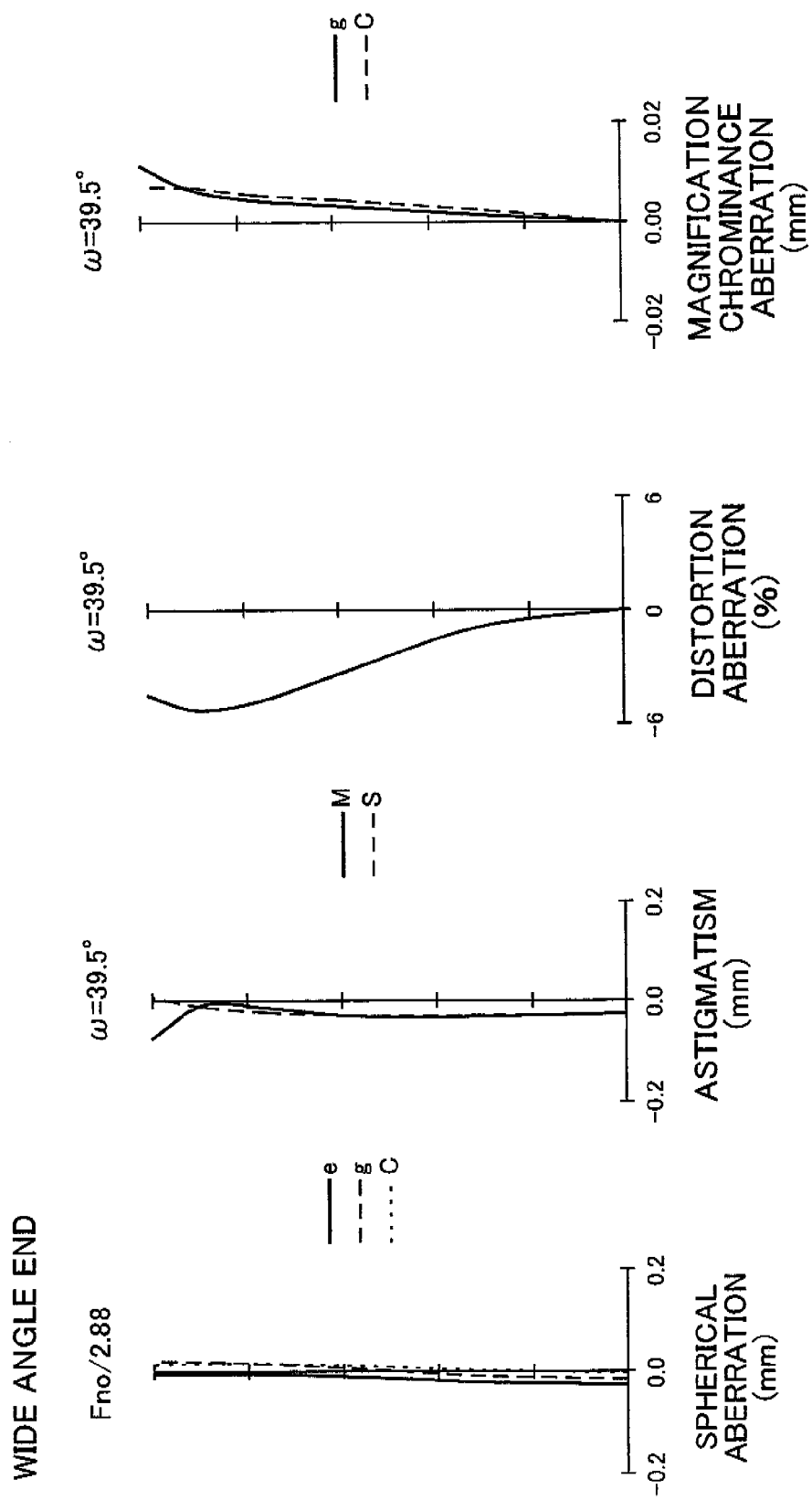
FIG. 14 is aberration diagrams of lens groups in Example 2 at the wide angle end.
Figure 15:
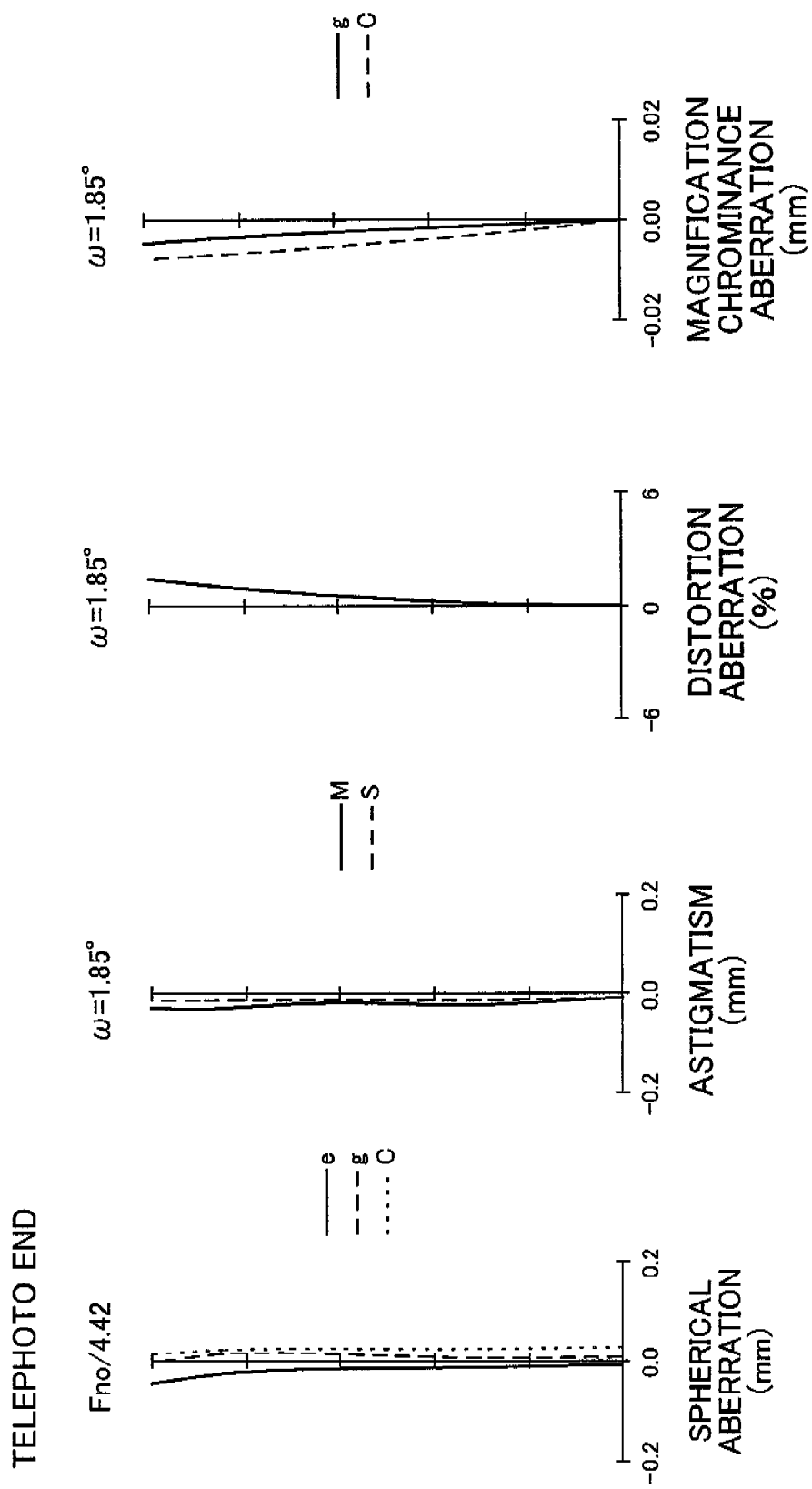
FIG. 15 is aberration diagrams of lens groups in Example 2 at the telephoto end.

Spherical aberration, astigmatism, distortion aberration, and magnification chromatic aberration of the zoom optical system 1B in Example 2 having the above lens arrangement and construction are shown in FIGS. 14 and 15. FIG. 14 shows the aberrations at the wide angle end [W], and FIG. 15 shows the aberrations at the telephoto end [T].

Example 3

Figure 8:
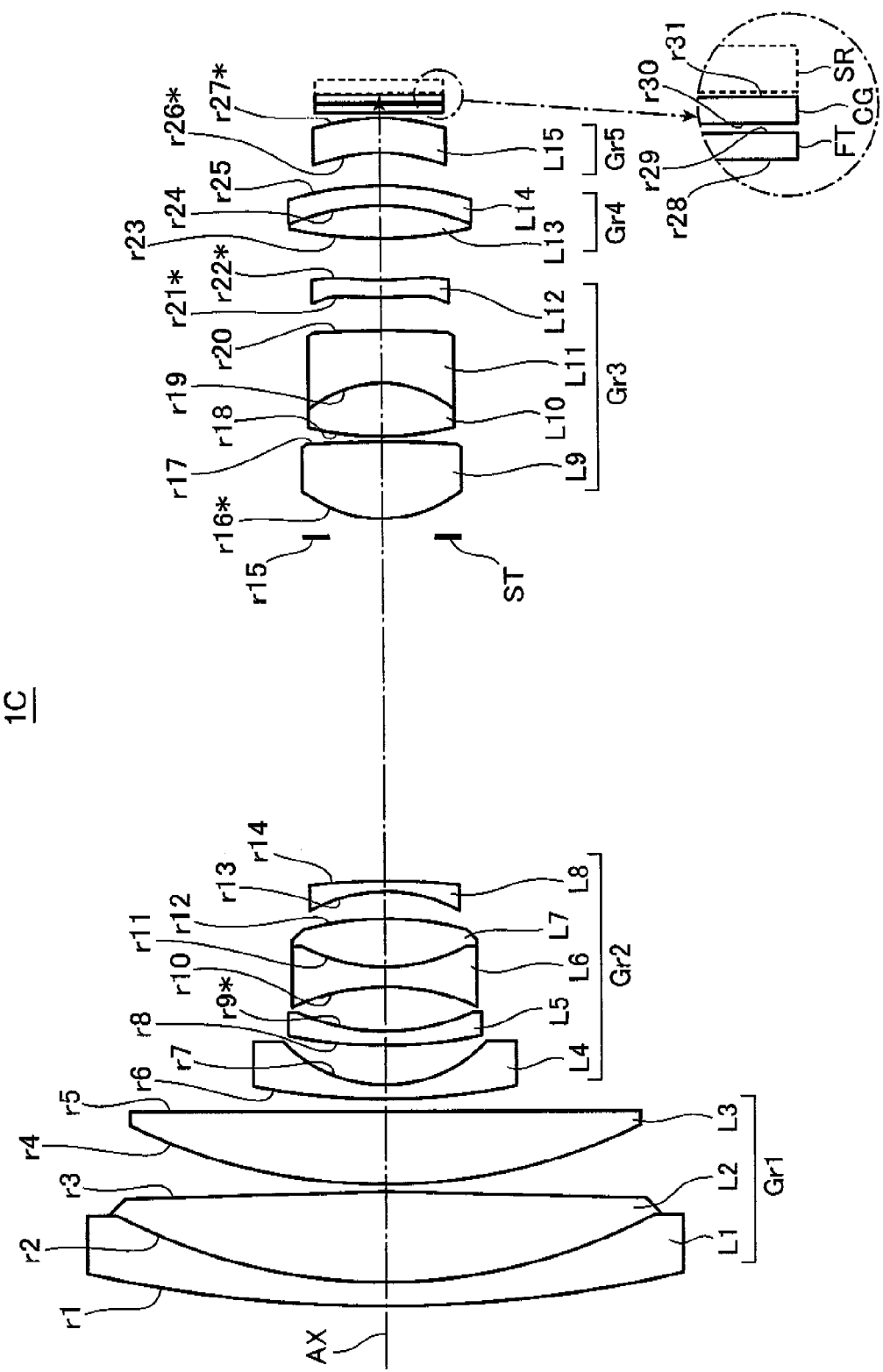
FIG. 8 is a cross-sectional view i.e. an optical path diagram of a zoom optical system in Example 3 at a wide angle end.
Figure 9A:
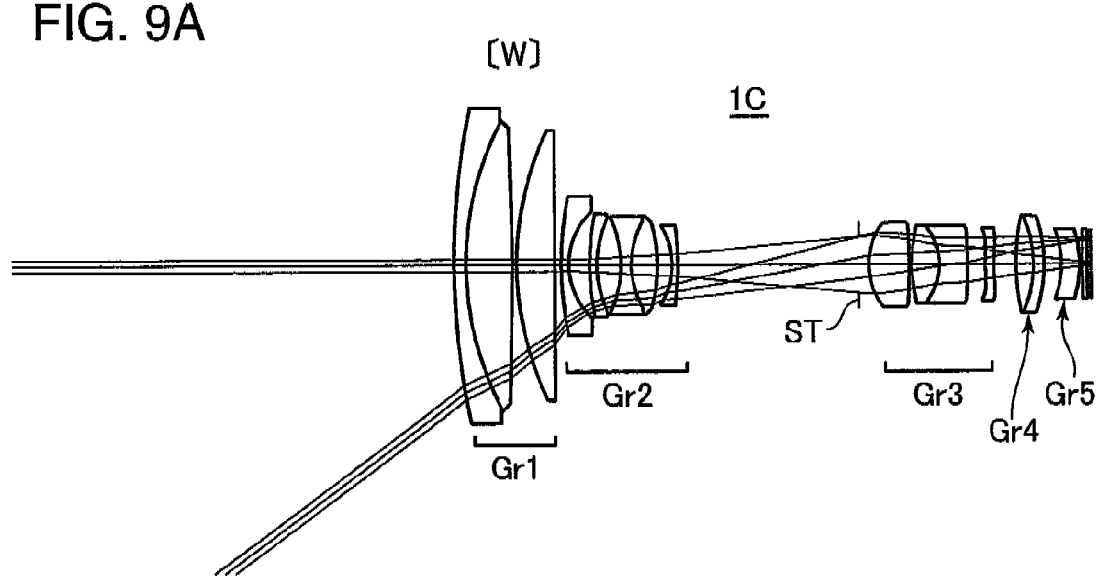
Figure 9B:
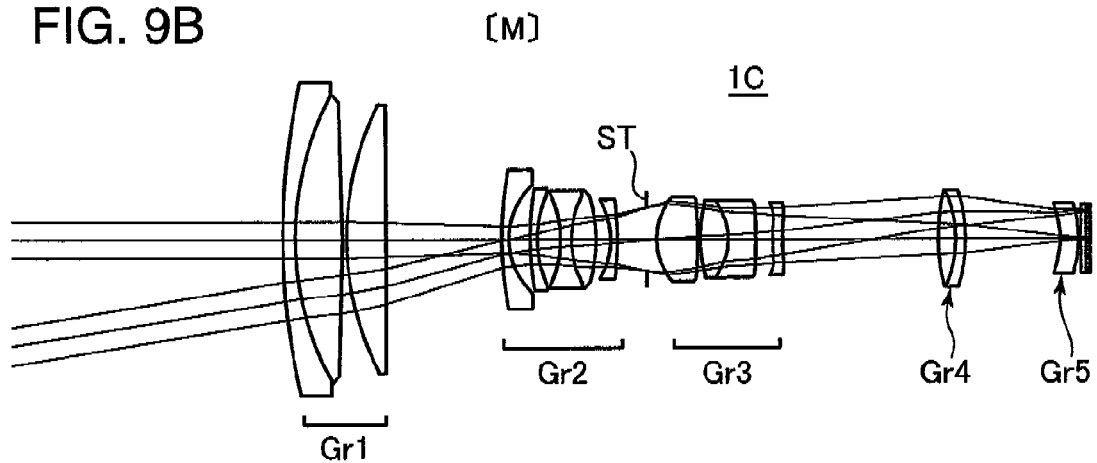
Figure 9C:
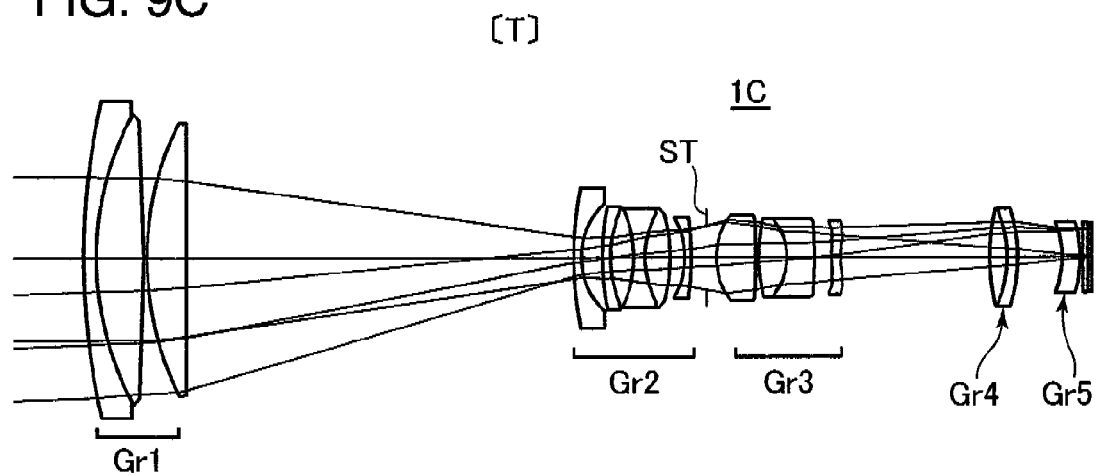

FIGS. 8, and 9A through 9C are cross-sectional views taken along the optical axis (AX), each showing an arrangement of lens groups in a zoom optical system 1C in Example 3. The zoom optical system 1C in Example 3 is a five-component zoom system having a positive-negative-positive-positive-negative arrangement, which includes, in this order from the object side, a first lens group (Gr1) having a positive optical power as a whole, a second lens group (Gr2) having a negative optical power as a whole, an aperture stop (ST), a third lens group (Gr3) having a positive optical power as a whole, a fourth lens group (Gr4) having a positive optical power, and a fifth lens group (Gr5) having a negative optical power. As shown in FIGS. 9A through 9C, the first lens group (Gr1) through the fourth lens group (Gr4) are moved independently of each other in zooming.

More specifically, each of the lens groups in the zoom optical system 1C in Example 3 has the following arrangement in this order from the object side, as shown in FIG. 8. The first lens group (Gr1) is constituted of a negative meniscus lens element (first lens element L1) convex to the object side, a biconvex positive lens element (second lens element L2), and a positive meniscus lens element (third lens element L3) convex to the object side. The first lens element L1 and the second lens element L2 constitute a cemented lens element. The second lens group (Gr2) is constituted of a negative meniscus lens element (fourth lens element L4) convex to the object side, a negative meniscus lens element (fifth lens element L5) convex to the object side, a biconcave negative lens element (sixth lens element L6), a biconvex positive lens element (seventh lens element L7), and a negative meniscus lens element (eighth lens element L8) convex to the image side. The sixth lens element L6 and the seventh lens element L7 constitute a cemented lens element.

The third lens group (Gr3) is constituted of a biconvex positive lens element (ninth lens element L9), a biconvex positive lens element (tenth lens element L10), a negative meniscus lens element (eleventh lens element L11) convex to the image side, and a negative meniscus lens element (twelfth lens element L12) convex to the object side. The tenth lens element L10 and the eleventh lens element L11 constitute a cemented lens element. An aperture stop (ST) movable with the third lens group (Gr3) in zooming is provided on the object side of the third lens group (Gr3). The fourth lens group (Gr4) is constituted of a cemented lens element made of a biconvex positive lens element (thirteenth lens element L13) and a negative meniscus lens element (fourteenth lens element L14) convex to the image side. The fifth lens group (Gr5) is constituted of a single negative meniscus lens element (fifteenth lens element L15) convex to the image side. A light receiving surface of an image sensor (SR) is provided on the image side of the fifth lens group (Gr5) via a parallel plane plate (FT) and a cover glass (CG).

As shown in FIGS. 9A through 9C, in the zoom optical system 1C in Example 3, in zooming from the wide angle end [W] to the telephoto end [T], the first lens group (Gr1) is linearly moved toward the object side, and the second lens group (Gr2), the third lens group (Gr3), and the fourth lens group (Gr4) are moved in such a manner that the trajectory thereof is convex toward the object side. The fifth lens group (Gr5) is unmoved in zooming. Also, in zooming, the distance between the first lens group (Gr1) and the second lens group (Gr2) is increased, and the distance between the second lens group (Gr2) and the third lens group (Gr3) is decreased.

Construction data concerning the lens elements in the zoom optical system 1C in Example 3 are shown in the following.

Numerical data in Example 3

Unit: mm
Lens surface data

| lens surface No. | r | d | nd | vd | θg, F |
|---|---|---|---|---|---|
| object plane | ∞ | ∞ | | | |
| 1 | 99.043 | 1.600 | 1.80610 | 40.7 | 0.5670 |
| 2 | 40.392 | 6.327 | 1.49700 | 81.6 | 0.5386 |
| 3 | −331.403 | 0.511 | | | |
| 4 | 40.706 | 4.986 | 1.48749 | 70.5 | 0.5303 |
| 5 | 772.213 | variable | | | |
| 6 | 47.222 | 1.001 | 1.84666 | 23.8 | 0.6191 |
| 7 | 9.822 | 2.858 | | | |
| 8 | 35.262 | 1.008 | 1.81359 | 25.7 | 0.6161 |
| 9* | 14.887 | 3.127 | | | |
| 10 | −15.290 | 1.356 | 1.58913 | 61.2 | 0.5395 |
| 11 | 12.374 | 3.431 | 1.84666 | 23.8 | 0.6191 |
| 12 | −20.372 | 1.904 | | | |
| 13 | −10.200 | 0.823 | 1.62041 | 60.4 | 0.5399 |
| 14 | −37.160 | variable | | | |
| 15 (aperture stop) | ∞ | 1.300 | | | |
| 16* | 8.816 | 5.447 | 1.58913 | 61.2 | 0.5374 |
| 17 | −92.480 | 0.311 | | | |
| 18 | 21.242 | 3.832 | 1.49700 | 81.6 | 0.5386 |
| 19 | −7.998 | 3.690 | 1.90366 | 31.3 | 0.5946 |
| 20 | −81.953 | 2.230 | | | |
| 21* | 22.001 | 1.214 | 1.53048 | 55.7 | 0.5672 |
| 22* | 17.485 | variable | | | |
| 23 | 28.120 | 2.378 | 1.51680 | 64.2 | 0.5342 |
| 24 | −16.094 | 1.358 | 1.92286 | 20.9 | 0.6391 |
| 25 | −21.692 | variable | | | |
| 26* | −12.169 | 2.371 | 1.60280 | 28.3 | 0.5948 |
| 27* | −13.010 | 0.376 | | | |
| 28 | ∞ | 0.600 | 1.51680 | 64.2 | 0.5342 |
| 29 | ∞ | 0.100 | | | |

-continued

| | | | | | |
|---|---|---|---|---|---|
| 30 | ∞ | 0.500 | 1.51680 | 64.2 | 0.5342 |
| 31 (image plane) | ∞ | 0.000 | | | |

Aspherical surface data

9th surface

K = 0.000, A4 = −4.1296E−05, A6 = 2.1411E−08, A8 = 5.3737E−09, A10 = −1.2983E−10

16th surface

K = 0.000, A4 = −4.8761E−05, A6 = 1.9174E−07, A8 = −1.1770E−08, A10 = 2.1841E−10

21st surface

K = 0.000, A4 = −1.4137E−03, A6 = −2.1858E−05, A8 = −2.2985E−07, A10 = 1.1814E−08

22nd surface

K = 0.000, A4 = −1.0946E−03, A6 = −1.8655E−05, A8 = 3.7243E−07, A10 = 5.6586E−09

26th surface

K = 0.000, A4 = 6.6053E−05, A6 = 4.0325E−05, A8 = −2.9779E−06, A10 = 5.3581E−08

27th surface

K = 0.000, A4 = 9.1371E−04, A6 = 5.0036E−07, A8 = −1.9752E−06, A10 = 3.2864E−08

Various data zoom ratio 20.000

| | wide angle end | middle | telephoto end |
|---|---|---|---|
| focal length | 4.797 | 21.441 | 95.933 |
| F-number | 2.880 | 4.384 | 4.422 |
| half angle of view | 76.795 | 18.734 | 4.178 |
| image height | 3.600 | 3.600 | 3.600 |
| entire lens unit length | 85.599 | 108.146 | 134.889 |
| BF | 0.600 | 0.600 | 0.600 |
| d5 | 1.017 | 15.739 | 51.964 |
| d14 | 24.148 | 3.836 | 2.000 |
| d22 | 2.921 | 20.875 | 19.869 |
| d25 | 2.272 | 12.456 | 5.816 |

Zoom lens group data

| group | 1st lens surface | focal length |
|---|---|---|
| 1 | 1 | 75.293 |
| 2 | 6 | −7.246 |
| 3 | 16 | 14.834 |
| 4 | 23 | 28.268 |
| 5 | 26 | 5194.865 |

Figure 16:
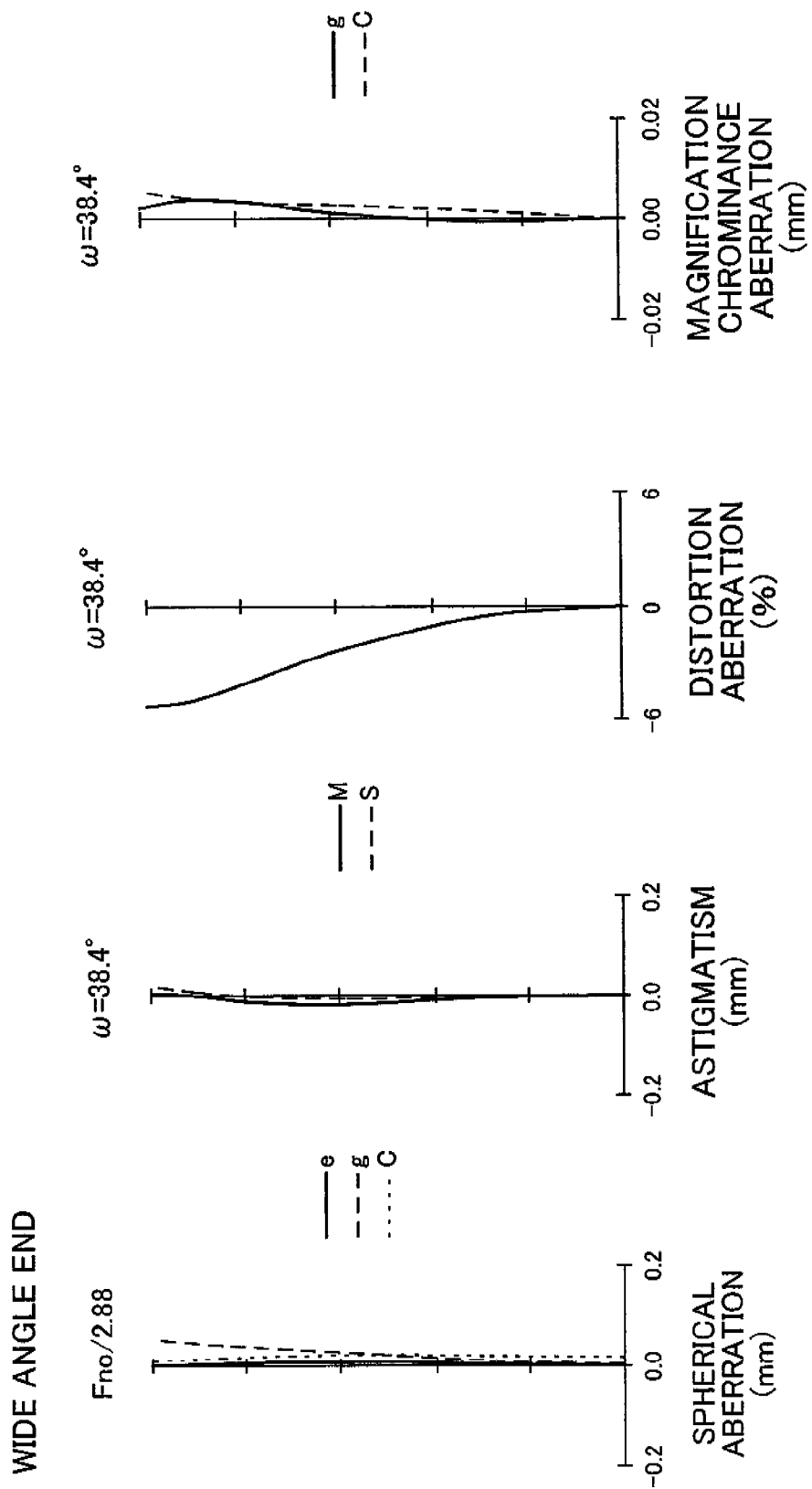
FIG. 16 is aberration diagrams of lens groups in Example 3 at the wide angle end.
Figure 17:
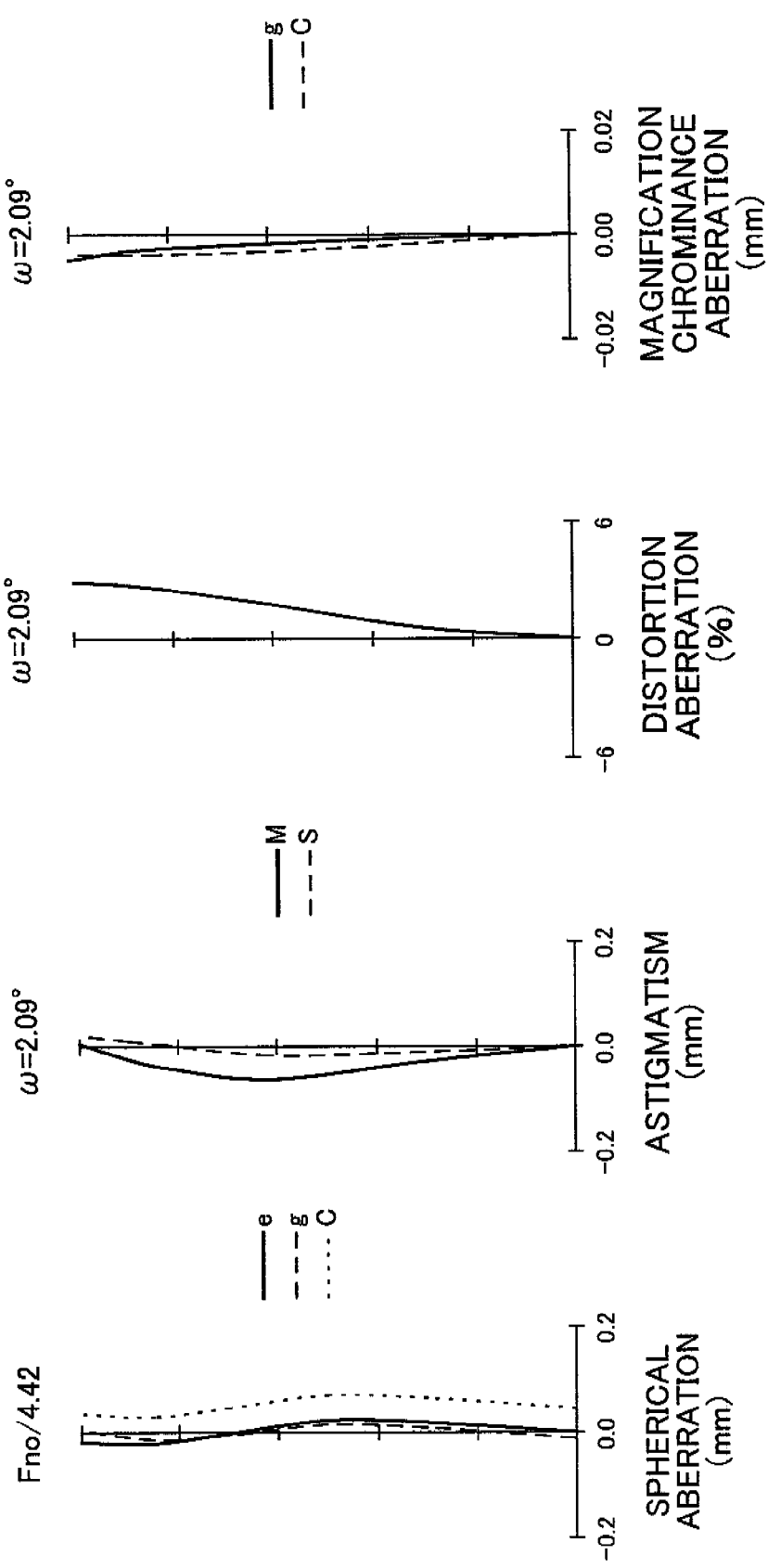
FIG. 17 is aberration diagrams of lens groups in Example 3 at the telephoto end.

Spherical aberration, astigmatism, distortion aberration, and magnification chromatic aberration of the zoom optical system 1C in Example 3 having the above lens arrangement and construction are shown in FIGS. 16 and 17. FIG. 16 shows the aberrations at the wide angle end [W], and FIG. 17 shows the aberrations at the telephoto end [T].

Example 4

Figure 10:
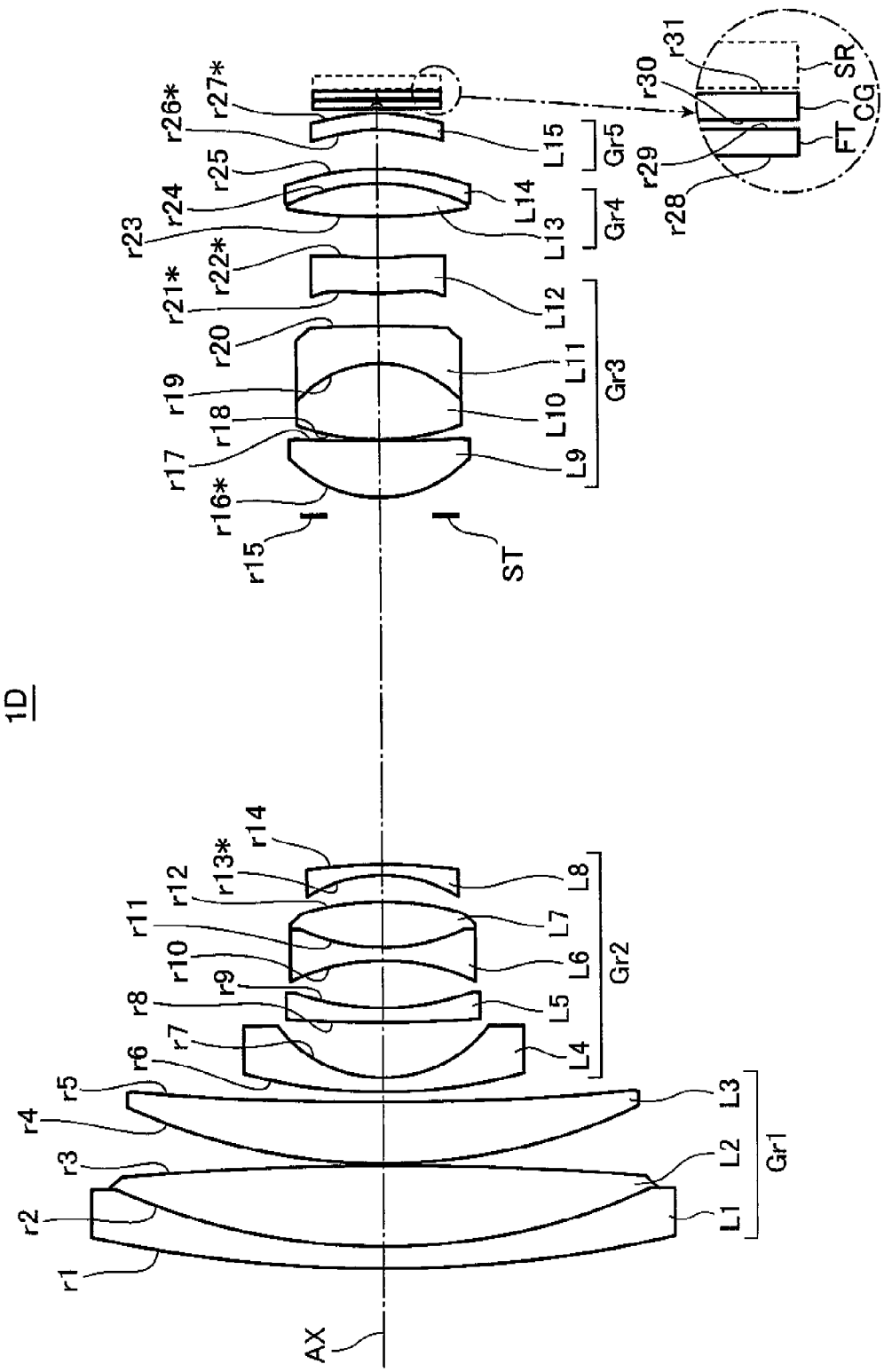
FIG. 10 is a cross-sectional view i.e. an optical path diagram of a zoom optical system in Example 4 at a wide angle end.
Figure 11A:
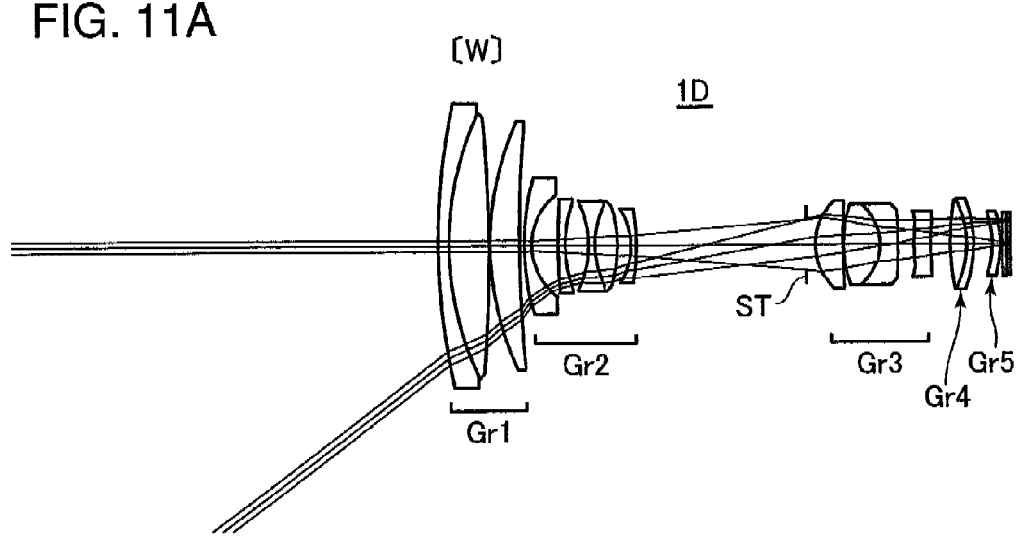
Figure 11B:
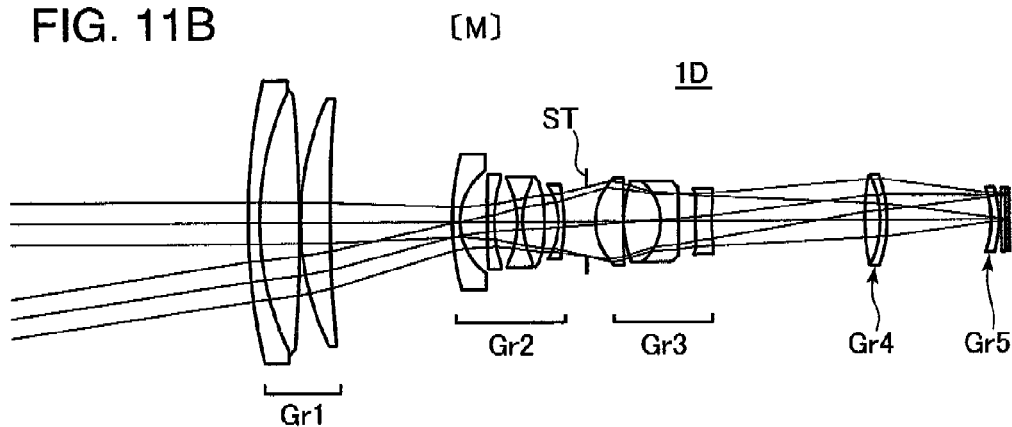
Figure 11C:
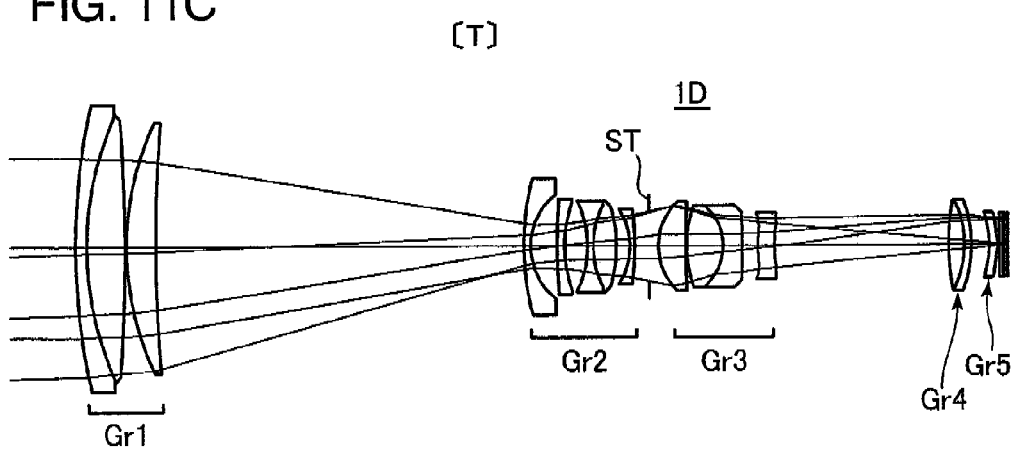

FIGS. 10, and 11A through 11C are cross-sectional views taken along the optical axis (AX), each showing an arrangement of lens groups in a zoom optical system 1D in Example 4. The zoom optical system 1D in Example 4 is a five-component zoom system having a positive-negative-positive-positive-positive arrangement, which includes, in this order from the object side, a first lens group (Gr1) having a positive optical power as a whole, a second lens group (Gr2) having a negative optical power as a whole, an aperture stop (ST), a third lens group (Gr3) having a positive optical power as a whole, a fourth lens group (Gr4) having a positive optical power as a whole, and a fifth lens group (Gr5) having a positive optical power. As shown in FIGS. 11A through 11C, the first lens group (Gr1) through the fourth lens group (Gr4) are moved independently of each other in zooming.

More specifically, each of the lens groups in the zoom optical system 1D in Example 4 has the following arrangement in this order from the object side, as shown in FIG. 10. The first lens group (Gr1) is constituted of a negative meniscus lens element (first lens element L1) convex to the object side, a biconvex positive lens element (second lens element L2), and a positive meniscus lens element (third lens element L2) convex to the object side. The first lens element L1 and the second lens element L2 constitute a cemented lens element. The second lens group (Gr2) is constituted of a negative meniscus lens element (fourth lens element L4) convex to the object side, a negative meniscus lens element (fifth lens element L5) convex to the object side, a biconcave negative lens element (sixth lens element L6), a biconvex positive lens element (seventh lens element L7), and a negative meniscus lens element (eighth lens element L8) convex to the image side. The sixth lens element L6 and the seventh lens element L7 constitute a cemented lens element.

The third lens group (Gr3) is constituted of a positive meniscus lens element (ninth lens element L9) convex to the object side, a biconvex positive lens element (tenth lens element L10), a negative meniscus lens element (eleventh lens element L11) convex to the image side, and a negative meniscus lens element (twelfth lens element L12) convex to the object side. The tenth lens element L10 and the eleventh lens element L11 constitute a cemented lens element. An aperture stop (ST) movable with the third lens group (Gr3) in zooming is provided on the object side of the third lens group (Gr3). The fourth lens group (Gr4) is constituted of a cemented lens element made of a biconvex positive lens element (thirteenth lens element L13) and a negative meniscus lens element (fourteenth lens element L14) convex to the image side. The fifth lens group (Gr5) is constituted of a single positive meniscus lens element (fifteenth lens element L15) convex to the image side. A light receiving surface of an image sensor (SR) is provided on the image side of the fifth lens group (Gr5) via a parallel plane plate (FT) and a cover glass (CG).

As shown in FIGS. 11A through 11C, in the zoom optical system 1D in Example 4, in zooming from the wide angle end [W] to the telephoto end [T], the first lens group (Gr1) is linearly moved toward the object side, and the second lens group (Gr2), the third lens group (Gr3), and the fourth lens group (Gr4) are moved in such a manner that the trajectory thereof is convex toward the object side. The fifth lens group (Gr5) is unmoved in zooming. Also, in zooming, the distance between the first lens group (Gr1) and the second lens group (Gr2) is increased, and the distance between the second lens group (Gr2) and the third lens group (Gr3) is decreased.

Construction data concerning the lens elements in the zoom optical system 1D in Example 4 are shown in the following.

Numerical Data on Example 4

| | | Unit: mm Lens surface data | | | |
|---|---|---|---|---|---|
| lens surface No. | r | d | nd | vd | θg, F |
| object plane | ∞ | ∞ | | | |
| 1 | 95.356 | 1.600 | 1.80450 | 39.6 | 0.5709 |
| 2 | 45.438 | 5.730 | 1.49700 | 81.6 | 0.5386 |
| 3 | −259.670 | 0.100 | | | |
| 4 | 42.109 | 4.291 | 1.49700 | 81.6 | 0.5386 |
| 5 | 216.139 | variable | | | |
| 6 | 37.515 | 1.014 | 1.80518 | 25.5 | 0.6156 |
| 7 | 9.265 | 3.926 | | | |
| 8 | 134.570 | 1.000 | 1.80518 | 25.5 | 0.6156 |
| 9 | 19.219 | 3.386 | | | |
| 10 | −14.598 | 0.801 | 1.56883 | 56.0 | 0.5488 |
| 11 | 13.367 | 3.332 | 1.84666 | 23.8 | 0.6191 |
| 12 | −19.256 | 1.886 | | | |
| 13* | −9.871 | 0.800 | 1.58913 | 61.2 | 0.5374 |
| 14 | −31.794 | variable | | | |
| 15 (aperture stop) | ∞ | 1.300 | | | |
| 16* | 8.602 | 3.971 | 1.58913 | 61.2 | 0.5374 |
| 17 | 214.849 | 0.100 | | | |
| 18 | 17.252 | 5.333 | 1.49700 | 81.6 | 0.5386 |
| 19 | −7.500 | 2.615 | 1.90366 | 31.3 | 0.5946 |
| 20 | −122.455 | 2.284 | | | |
| 21* | 23.203 | 2.406 | 1.53048 | 55.7 | 0.5672 |
| 22* | 20.704 | variable | | | |
| 23 | 35.111 | 2.323 | 1.51680 | 64.2 | 0.5342 |
| 24 | −14.879 | 1.000 | 1.92286 | 20.9 | 0.6391 |
| 25 | −19.321 | variable | | | |
| 26* | −10.906 | 1.150 | 1.60280 | 28.3 | 0.5948 |
| 27* | −10.351 | 0.300 | | | |
| 28 | ∞ | 0.600 | 1.51680 | 64.2 | 0.5342 |
| 29 | ∞ | 0.100 | | | |
| 30 | ∞ | 0.500 | 1.51680 | 64.2 | 0.5342 |
| 31 (image plane) | ∞ | 0.000 | | | |

Aspherical surface data

13th surface

K = 0.000, A4 = 2.3475E−05, A6 = −2.3434E−07, A8 = 1.0334E−08, A10 = −4.2607E−11

16th surface

K = 0.000, A4 = −3.9975E−05, A6 = 5.4330E−07, A8 = −1.7529E−08, A10 = 3.5485E−10

21st surface

K = 0.000, A4 = −9.4971E−04, A6 = −1.7946E−05, A8 = −2.8027E−07, A10 = −2.6674E−09

22nd surface

K = 0.000, A4 = −4.8964E−04, A6 = −1.4059E−05, A8 = 6.7553E−08, A10 = 6.1306E−09

26th surface

K = 0.000, A4 = 5.5693E−05, A6 = 1.6545E−04, A8 = −1.0783E−05, A10 = 1.9788E−07

27th surface

K = 0.000, A4 = 3.1217E−04, A6 = 2.4040E−04, A8 = −1.5976E−05, A10 = 2.9153E−07

Various data

| zoom ratio | | 24.000 | |
|---|---|---|---|
| | wide angle end | middle | telephoto end |
| focal length | 4.760 | 23.324 | 114.240 |
| F-number | 2.880 | 3.834 | 4.422 |
| half angle of view | 77.159 | 17.273 | 3.512 |
| image height | 3.600 | 3.600 | 3.600 |
| entire lens unit length | 83.156 | 110.350 | 135.000 |
| BF | 0.600 | 0.600 | 0.600 |
| d5 | 0.700 | 17.695 | 52.835 |
| d14 | 24.392 | 3.181 | 2.000 |

-continued

| | | | |
|---|---|---|---|
| d22 | 2.992 | 22.045 | 25.218 |
| d25 | 2.626 | 14.982 | 2.500 |

Zoom lens group data

| group | 1st lens surface | focal length |
|---|---|---|
| 1 | 1 | 76.489 |
| 2 | 6 | −7.403 |
| 3 | 16 | 14.726 |
| 4 | 23 | 28.549 |
| 5 | 26 | 189.674 |

Figure 18:
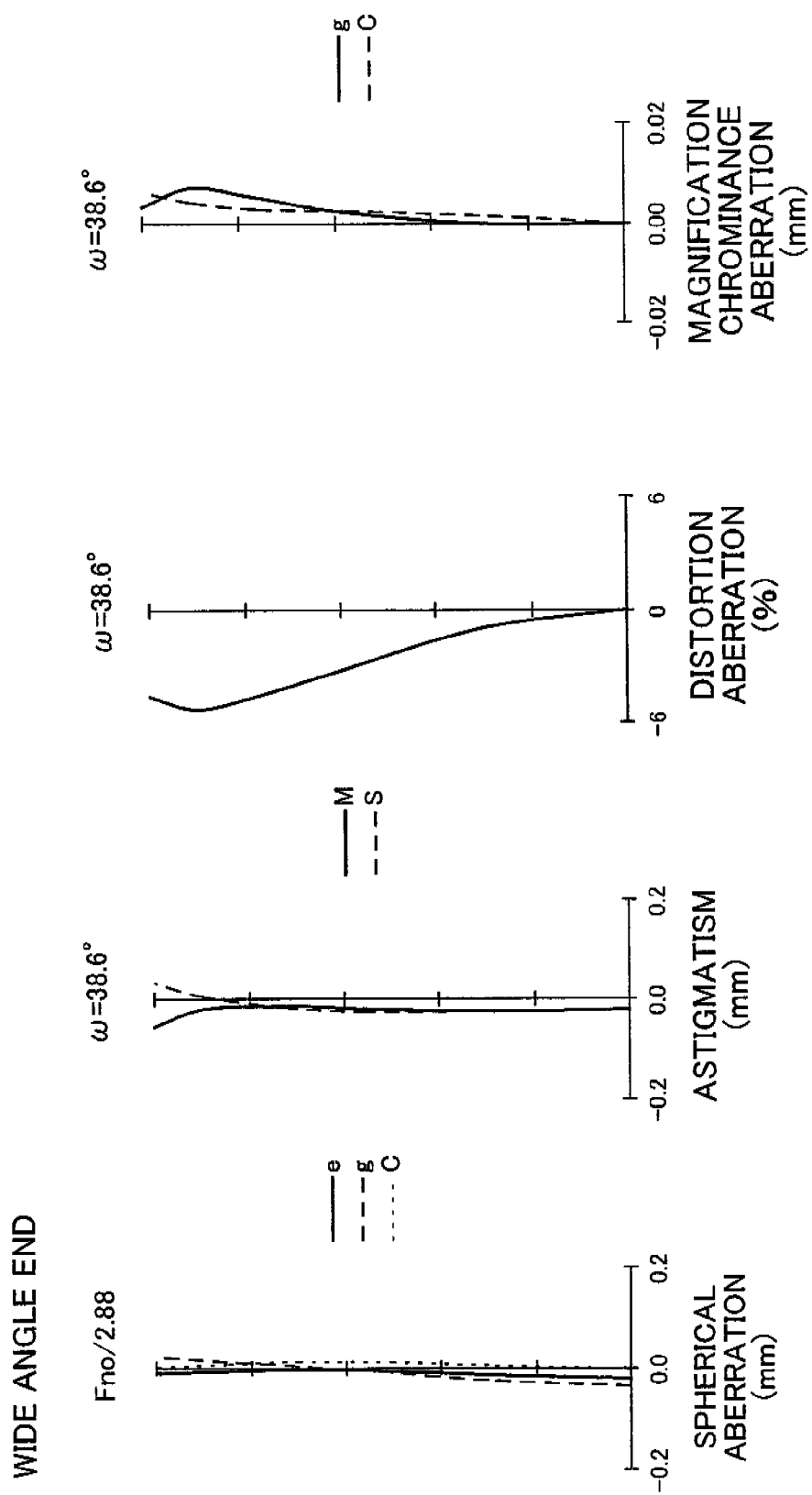
FIG. 18 is aberration diagrams of lens groups in Example 4 at the wide angle end.
Figure 19:
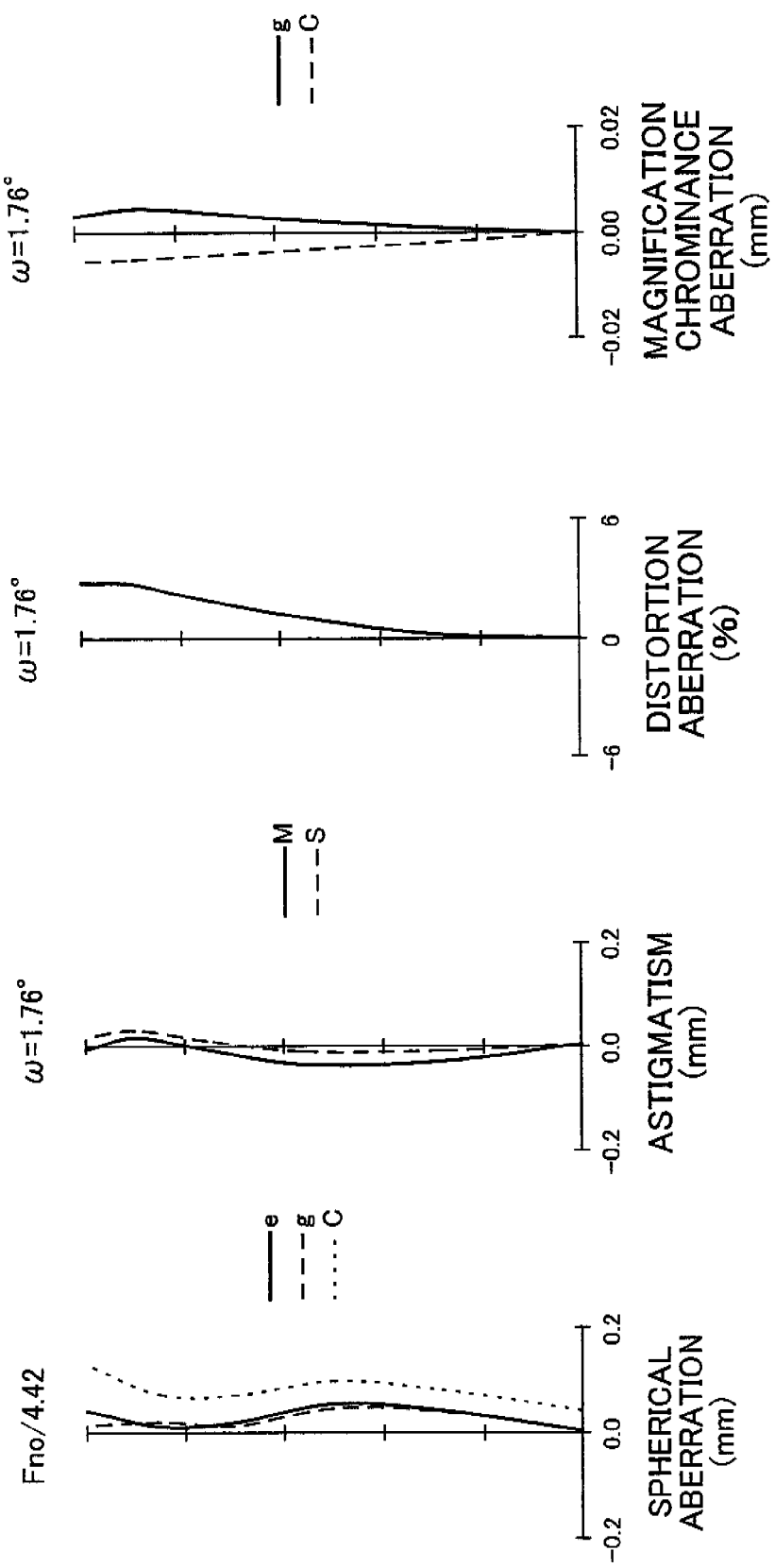
FIG. 19 is aberration diagrams of lens groups in Example 4 at the telephoto end.

Spherical aberration, astigmatism, distortion aberration, and magnification chromatic aberration of the zoom optical system 1D in Example 4 having the above lens arrangement and construction are shown in FIGS. 18 and 19. FIG. 18 shows the aberrations at the wide angle end [W], and FIG. 19 shows the aberrations at the telephoto end [T].

Numerical values of the conditional expressions (1) through (10) in the case where the conditional expressions (1) through (10) are applied to the zoom optical systems 1A through 1D in Examples 1 through 4 are shown in Table 1.

TABLE 1

| | Conditional expression | Example 1 | Example 2 | Example 3 | Example 4 |
|---|---|---|---|---|---|
| (1) | $vd_2$ | 20.9 | 20.9 | 23.8 | 25.5 |
| (2) | $vd_{1n}$ | 40.8 | 40.8 | 40.7 | 39.6 |
| (3) | $\theta g, F_2 + 0.001767 * vd_2 - 0.6477$ | 0.028 | 0.028 | 0.013 | 0.013 |
| (4) | $\theta g, F_{1n} + 0.001767 * vd_{1n} - 0.6477$ | −0.010 | −0.010 | −0.009 | −0.006 |
| (5) | $\theta g, F_{1p} + 0.001767 * vd_{1p} - 0.6477$ | G2:0.007 G3: 0.035 | G2:0.007 G3: 0.035 | G2:0.035 G3: 0.007 | G2:0.035 G3: 0.035 |
| (6) | $f1/\sqrt{(fw*ft)}$ | 3.19 | 3.66 | 3.51 | 3.28 |
| (7) | $f2/\sqrt{(fw*ft)}$ | −0.31 | −0.32 | −0.34 | −0.32 |
| (8) | $f3/\sqrt{(fw*ft)}$ | 0.64 | 0.60 | 0.69 | 0.63 |
| (9) | ft/fw | 24.0 | 24.0 | 20.0 | 24.0 |
| (10) | hb/fw | 2.34 | 2.59 | 2.23 | 2.34 |

As described above, the zoom optical systems 1A, 1B, 1C, and 1D in Examples 1, 2, 3, and 4 satisfy the requirements in the embodiment of the invention. Accordingly, the zoom optical systems 1A through 1D have superior optical characteristics that spherical aberration is within about 50 μm, and magnification chromatic aberration in using g-line and C-line is within about 10 μm with respect to an image of 7.2 mm in spot diameter at both of the wide angle end [W] and the telephoto end [T], as well as on-axis chromatic aberration at the telephoto end [T] of about 100 μm or less. The above features show that the zoom optical systems 1A through 1D are sufficiently miniaturized, and superior optical characteristics are secured, despite a large zoom ratio of twenty times or more.

The foregoing embodiment primarily includes the following arrangements.

A zoom optical system according to an aspect of the invention at least includes in the order from an object side: a first lens group having a positive optical power; a second lens group having a negative optical power; and a third lens group having a positive optical power, wherein in zooming from a wide angle end to a telephoto end, a distance between the first lens group and the second lens group is increased, and a distance between the second lens group and the third lens group is decreased, and the first lens group includes at least one negative lens element, and the second lens group includes a negative lens element closest to the object side, with a lens surface of the negative lens element being concave toward an image side, and the zoom optical system satisfies the following conditional expressions (1) and (2):

$$vd_2 < 30 \quad (1)$$

$$50 > vd_{1n} > 30 \quad (2)$$

where $vd_2$ represents the Abbe number of the negative lens element closest to the object side in the second lens group, and $vd_{1n}$ represents an Abbe number of a negative lens element, or an average Abbe number of negative lens elements in the first lens group.

In the above arrangement, preferably, the negative lens element closest to the object side in the second lens group may satisfy the following conditional expression (10):

$$hb/fw \geq 1.5 \quad (10)$$

where hb represents an off-axis ray height on the lens surface closest to the object side in the second lens group, and is a value calculated by paraxial approximation in the case where a ray whose tangent of incident angle is 1.0 is incident onto the zoom optical system in a manner that the ray intersects with an optical axis at a diaphragm position, and fw represents a focal length of an entirety of the zoom optical system at the wide angle end.

In the above arrangement, preferably, the negative lens element closest to the object side in the second lens group may satisfy the following conditional expression (3):

$$\theta g, F_2 + 0.001767 * vd_2 - 0.6477 > 0.004 \quad (3)$$

where $\theta g, F_2$ represents a partial dispersion ratio of the negative lens element closest to the object side in the second lens group, assuming that $\theta g, F = (ng - nF)/(nF - nC)$, and the symbol "*" indicates multiplication, and the symbol "/" indicates division.

In the above arrangement, preferably, the negative lens element closest to the object side in the second lens group may satisfy the following conditional expression (3a):

$$\theta g, F_2 + 0.001767 * vd_2 - 0.6477 > 0.01 \quad (3a)$$

In the above arrangement, preferably, the negative lens element in the first lens group may satisfy the following conditional expression (4):

$$\theta g, F_{1n} + 0.001767 * vd_{1n} - 0.6477 < -0.004 \quad (4)$$

where $\theta g, F_{1n}$ represents an average value of a partial dispersion ratio of the negative lens element in the first lens group, assuming that $\theta g, F = (ng-nF)/(nF-nC)$, and the symbol "*" indicates multiplication, and the symbol "/" indicates division.

In the above arrangement, preferably, the negative lens element in the first lens group may satisfy the following conditional expression (4a):

$$\theta g / F_{1n} + 0.001767 * vd_{1n} - 0.6477 < -0.006 \quad (4a)$$

In any one of the above arrangements, preferably, at least one positive lens element in the first lens group may satisfy the following conditional expression (5):

$$\theta g, F_{1p} + 0.001767 * vd_{1p} - 0.6477 > 0.004 \quad (5)$$

where $\theta g, F_{1p}$ represents a partial dispersion ratio of the positive lens element in the first lens group, assuming that $\theta g, F = (ng-nF)/(nF-nC)$, and the symbol "*" indicates multiplication, and the symbol "/" indicates division.

Preferably, at least one positive lens element in the first lens group may satisfy the following conditional expression (5a):

$$\theta g, F_{1p} + 0.001767 * vd_{1p} - 0.6477 > 0.01 \quad (5a)$$

Preferably, the zoom optical system may further comprise a fourth lens group and a fifth lens group, wherein the fourth lens group has a positive optical power, and the fifth lens group has a negative optical power.

Preferably, the zoom optical system may further comprise a fourth lens group and a fifth lens group, wherein the fourth lens group has a negative optical power, and the fifth lens group has a positive optical power.

Preferably, the zoom optical system may further comprise a fourth lens group and a fifth lens group, wherein the fourth lens group has a positive optical power, and the fifth lens group has a positive optical power.

Preferably, the zoom optical system may further comprise an optical diaphragm on the object side of the third lens group, wherein the optical diaphragm is movable with the third lens group.

In any one of the above arrangements, preferably, the zoom optical system may satisfy the following conditional expressions (6), (7), and (8):

$$1.7 < f1/\sqrt{(fw*ft)} < 4.8 \quad (6)$$

$$-0.63 < f2/\sqrt{(fw*ft)} < -0.08 \quad (7)$$

$$0.21 < f3/\sqrt{(fw*ft)} < 1.25 \quad (8)$$

where f1 represents a focal length of the first lens group, f2 represents a focal length of the second lens group, f3 represents a focal length of the third lens group, fw represents a focal length of an entirety of the zoom optical system at the wide angle end, ft represents a focal length of an entirety of the zoom optical system at the telephoto end, the symbol "*" indicates multiplication, and the symbol "/" indicates division.

In any one of the above arrangements, preferably, the zoom optical system may satisfy the following conditional expression (9):

$$10.0 \leq ft/fw \quad (9)$$

where fw represents a focal length of an entirety of the zoom optical system at the wide angle end, and ft represents a focal length of an entirety of the zoom optical system at the telephoto end, and the symbol "/" indicates division.

An image pickup device according to another aspect of the invention includes: the zoom optical system having the above arrangement; and an image sensor, with a light receiving surface, for converting an optical image of a subject into an electrical signal, wherein the zoom optical system is so configured as to form the optical image of the subject on the light receiving surface of the image sensor.

A digital apparatus according to yet another aspect of the invention includes: the image pickup device having the above arrangement, and a controller for causing the image sensor to perform at least one of a still image photographing operation and a moving image photographing operation of the subject, wherein the zoom optical system is mounted on the image sensor to form the optical image of the subject on the light receiving surface of the image sensor.

As described above, in the zoom optical system including the first lens group having the positive optical power, the second lens group having the negative optical power, and the third lens group having the positive optical power in this order from the object side, the dispersion properties of the negative lens element and the positive lens element in the first lens group, and the lens element closest to the object side in the second lens group are properly defined. According to the embodiment of the invention, provided is a compact and high-performance zoom optical system having a large zoom ratio while suppressing cost increase. Further, the above arrangement enables to realize an image pickup device equipped with the compact and high-performance zoom optical system having a large zoom ratio, while suppressing cost increase. Further, loading the inventive image pickup device in a digital apparatus such as a digital camera is advantageous in miniaturizing the digital apparatus, and providing the digital apparatus with high performance and high function, while suppressing cost increase.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A zoom optical system at least comprising in the order from an object side:

a first lens group having a positive optical power;
a second lens group having a negative optical power; and
a third lens group having a positive optical power, wherein
in zooming from a wide angle end to a telephoto end, a distance between the first lens group and the second lens group is increased, and a distance between the second lens group and the third lens group is decreased, and
the first lens group includes at least one negative lens element, and the second lens group includes a negative lens element closest to the object side, with a lens surface of the negative lens element closest to the object side being concave toward an image side, and the zoom optical system satisfies the following conditional expressions (1) and (2):

$$vd_2 < 30 \quad (1)$$

$$50 > vd_{1n} > 30 \quad (2)$$

where $vd_2$ represents the Abbe number of the negative lens element closest to the object side in the second lens group, and $vd_{1n}$ represents an Abbe number of a negative lens element, or an average Abbe number of negative lens elements in the first lens group, and wherein the negative lens element closest to the object side in the second lens group satisfies the following conditional expression (10):

$$hb/fw \geq 1.5 \quad (10)$$

where hb represents an off-axis ray height on the lens surface closest to the object side in the second lens group, and is a value calculated by paraxial approximation in the case where a ray whose tangent of incident angle is 1.0 is incident onto the zoom optical system in a manner that the ray intersects with an optical axis at a diaphragm position, and fw represents a focal length of an entirety of the zoom optical system at the wide angle end.

2. The zoom optical system according to claim 1, wherein the negative lens element closest to the object side in the second lens group satisfies the following conditional expression (3):

$$\theta g, F_2 + 0.001767 * vd_2 - 0.6477 > 0.004 \quad (3)$$

where $\theta g, F_2$ represents a partial dispersion ratio of the negative lens element closest to the object side in the second lens group, assuming that $\theta g, F = (ng - nF)/(nF - nC)$, and the symbol "*" indicates multiplication, and the symbol "/" indicates division.

3. The zoom optical system according to claim 2, wherein the negative lens element closest to the object side in the second lens group satisfies the following conditional expression (3a):

$$\theta g, F_2 + 0.001767 * vd_2 - 0.6477 > 0.01 \quad (3a)$$

4. The zoom optical system according to claim 1, wherein first lens group includes only one negative lens element and the negative lens element in the first lens group satisfies the following conditional expression (4):

$$\theta g, F_{1n} + 0.001767 * vd_{1n} - 0.6477 < -0.004 \quad (4)$$

where $\theta g, F_{1n}$ represents an average value of a partial dispersion ratio of the negative lens element in the first lens group, assuming that $\theta g, F = (ng - nF)/(nF - nC)$, and the symbol "*" indicates multiplication, and the symbol "/" indicates division.

5. The zoom optical system according to claim 4, wherein the negative lens element in the first lens group satisfies the following conditional expression (4a):

$$\theta g, F_{1n} + 0.001767 * vd_{1n} - 0.6477 < -0.006 \quad (4a)$$

6. The zoom optical system according to claim 1, wherein at least one positive lens element in the first lens group satisfies the following conditional expression (5):

$$\theta g, F_{1n} + 0.001767 * vd_{1p} - 0.6477 > 0.004 \quad (5)$$

where $\theta g, F_{1p}$ represents a partial dispersion ratio of the at least one positive lens element in the first lens group, assuming that $\theta g, F = (ng - nF)/(nF - nC)$, and the symbol "*" indicates multiplication, and the symbol "/" indicates division.

7. The zoom optical system according to claim 6, wherein at least one positive lens element in the first lens group satisfies the following conditional expression (5a):

$$\theta g, F_{1p} + 0.001767 * vd_{1p} - 0.6477 > 0.01 \quad (5a)$$

8. The zoom optical system according to claim 1, further comprising:

a fourth lens group and a fifth lens group, wherein
the fourth lens group has a positive optical power, and
the fifth lens group has a negative optical power.

9. The zoom optical system according to claim 1, further comprising:

a fourth lens group and a fifth lens group, wherein
the fourth lens group has a negative optical power, and
the fifth lens group has a positive optical power.

10. The zoom optical system according to claim 1, further comprising:

a fourth lens group and a fifth lens group, wherein
the fourth lens group has a positive optical power, and
the fifth lens group has a positive optical power.

11. The zoom optical system according to claim 1, further comprising an optical diaphragm on the object side of the third lens group, wherein the optical diaphragm is movable with the third lens group.

12. The zoom optical system according to claim 1, wherein the zoom optical system satisfies the following conditional expressions (6), (7), and (8):

$$1.7 < f1/\sqrt{(fw*ft)} < 4.8 \quad (6)$$

$$-0.63 < f2/\sqrt{(fw*ft)} < -0.08 \quad (7)$$

$$0.21 < f3/\sqrt{(fw*ft)} < 1.25 \quad (8)$$

where f1 represents a focal length of the first lens group, f2 represents a focal length of the second lens group, f3 represents a focal length of the third lens group, fw represents a focal length of an entirety of the zoom optical system at the wide angle end, and ft represents a focal length of an entirety of the zoom optical system at the telephoto end, and the symbol "*" indicates multiplication, and the symbol "/" indicates division.

13. The zoom optical system according to claim 1, wherein the zoom optical system satisfies the following conditional expression (9):

$$10.0 \leq ft/fw \quad (9)$$

where fw represents a focal length of an entirety of the zoom optical system at the wide angle end, and ft represents a focal length of an entirety of the zoom optical system at the telephoto end, and the symbol "/" indicates division.

14. An image pickup device, comprising:

a zoom optical system at least including in the order from an object side:

a first lens group having a positive optical power;
a second lens group having a negative optical power; and
a third lens group having a positive optical power, wherein in zooming from a wide angle end to a telephoto end, a distance between the first lens group and the second lens group is increased, and a distance between the second lens group and the third lens group is decreased, and the first lens group includes at least one negative lens element, and the second lens group includes a negative lens element closest to the object side, with a lens surface of the negative lens element closest to the object side being concave toward an image side, and the zoom optical system satisfies the following conditional expressions (1) and (2):

$$vd_2 < 30 \qquad (1)$$

$$50 > vd_{1n} > 30 \qquad (2)$$

where $vd_2$ represents the Abbe number of the negative lens element closest to the object side in the second lens group, and $vd_{1n}$ represents an Abbe number of a negative lens element, or an average Abbe number of negative lens elements in the first lens group; and an image sensor, with a light receiving surface, for converting an optical image of a subject into an electrical signal, wherein the zoom optical system is so configured as to form the optical image of the subject on the light receiving surface of the image sensor, and wherein the negative lens element closest to the object side in the second lens group satisfies the following conditional expression (10):

$$hb/fw \geq 1.5 \qquad (10)$$

where hb represents an off-axis ray height on the lens surface closest to the object side in the second lens group, and is a value calculated by paraxial approximation in the case where a ray whose tangent of incident angle is 1.0 is incident onto the zoom optical system in a manner that the ray intersects with an optical axis at a diaphragm position, and fw represents a focal length of an entirety of the zoom optical system at the wide angle end.

15. A digital apparatus, comprising:
an image pickup device including
a zoom optical system at least having in the order from an object side:
a first lens group having a positive optical power;
a second lens group having a negative optical power; and
a third lens group having a positive optical power, wherein
in zooming from a wide angle end to a telephoto end, a distance between the first lens group and the second lens group is increased, and a distance between the second lens group and the third lens group is decreased, and
the first lens group includes at least one negative lens element, and the second lens group includes a negative lens element closest to the object side, with a lens surface of the negative lens element closest to the object side being concave toward an image side, and
the zoom optical system satisfies the following conditional expressions (1) and (2):

$$vd_2 < 30 \qquad (1)$$

$$50 > vd_{1n} > 30 \qquad (2)$$

where $vd_2$ represents the Abbe number of the negative lens element closest to the object side in the second lens group, and $vd_1$ represents an Abbe number of a negative lens element, or an average Abbe number of negative lens elements in the first lens group; and
an image sensor, with a light receiving surface, for converting an optical image of a subject into an electrical signal, wherein
the zoom optical system is so configured as to form the optical image of the subject on the light receiving surface of the image sensor; and a controller for causing the image sensor to perform at least one of a still image photographing operation and a moving image photographing operation of the subject, wherein
the zoom optical system is mounted on the image sensor to form the optical image of the subject on the light receiving surface of the image sensor, and
wherein the negative lens element closest to the object side in the second lens group satisfies the following conditional expression (10):

$$hb/fw \geq 1.5 \qquad (10)$$

where hb represents an off-axis ray height on the lens surface closest to the object side in the second lens group, and is a value calculated by paraxial approximation in the case where a ray whose tangent of incident angle is 1.0 is incident onto the zoom optical system in a manner that the ray intersects with an optical axis at a diaphragm position, and fw represents a focal length of an entirety of the zoom optical system at the wide angle end.

16. A zoom optical system at least comprising in the order from an object side:
a first lens group having a positive optical power;
a second lens group having a negative optical power;
a third lens group having a positive optical power;
a fourth lens group having a positive optical power, and
a fifth lens group having a positive optical power, wherein
in zooming from a wide angle end to a telephoto end, a distance between the first lens group and the second lens group is increased, and a distance between the second lens group and the third lens group is decreased, and
the first lens group includes at least one negative lens element, and the second lens group includes a negative lens element closest to the object side, with a lens surface of the negative lens element closest to the object side being concave toward an image side, and
the zoom optical system satisfies the following conditional expressions (1) and (2):

$$vd_2 < 30 \qquad (1)$$

$$50 > vd_{1n} > 30 \qquad (2)$$

where vd2 represents the Abbe number of the negative lens element closest to the object side in the second lens group, and $vd_{1n}$ represents an Abbe number of a negative lens element, or an average Abbe number of negative lens elements in the first lens group.

17. A zoom optical system at least comprising in the order from an object side:
a first lens group having a positive optical power;
a second lens group having a negative optical power; and
a third lens group having a positive optical power, wherein
in zooming from a wide angle end to a telephoto end, a distance between the first lens group and the second lens group is increased, and a distance between the second lens group and the third lens group is decreased, and
the first lens group includes at least one negative lens element, and the second lens group includes a negative lens element closest to the object side, with a lens surface of the negative lens element closest to the object side being concave toward an image side, and
the zoom optical system satisfies the following conditional expressions (1), (2), (6), (7) and (8):

$$vd_2 < 30 \qquad (1)$$

$$50 > vd_{1n} > 30 \qquad (2)$$

$$1.7 < f1/\sqrt{(fw*ft)} < 4.8 \quad (6)$$

$$-0.63 < f2/\sqrt{(fw*ft)} < -0.08 \quad (7)$$

$$0.21 < f3/\sqrt{(fw*ft)} < 1.25 \quad (8)$$

where $vd_2$ represents the Abbe number of the negative lens element closest to the object side in the second lens group, $vd_{1n}$ represents an Abbe number of a negative lens element, or an average Abbe number of negative lens elements in the first lens group, f1 represents a focal length of the first lens group, f2 represents a focal length of the second lens group, f3 represents a focal length of the third lens group, fw represents a focal length of an entirety of the zoom optical system at the wide angle end, ft represents a focal length of an entirety of the zoom optical system at the telephoto end, and the symbol "*" indicates multiplication, and the symbol "/" indicates division.

18. A zoom optical system at least comprising in the order from an object side:

a first lens group having a positive optical power;

a second lens group having a negative optical power; and a third lens group having a positive optical power, wherein in zooming from a wide angle end to a telephoto end, a distance between the first lens group and the second lens group is increased, and a distance between the second lens group and the third lens group is decreased, and the first lens group includes at least one negative lens element, and the second lens group includes a negative lens element closest to the object side, with a lens surface of the negative lens element closest to the object side being concave toward an image side, and the zoom optical system satisfies the following conditional expressions (1), (2) and (9):

$$vd_2 < 30 \quad (1)$$

$$50 > vd_{1n} > 30 \quad (2)$$

$$10.0 \leq ft/fw \quad (9)$$

where $vd_2$ represents the Abbe number of the negative lens element closest to the object side in the second lens group, $vd_{1n}$ represents an Abbe number of a negative lens element, or an average Abbe number of negative lens elements in the first lens group, fw represents a focal length of an entirety of the zoom optical system at the wide angle end, ft represents a focal length of an entirety of the zoom optical system at the telephoto end, and the symbol "/" indicates division.

* * * * *

UNITED STATES PATENT AND TRADEMARK OFFICE
CERTIFICATE OF CORRECTION

PATENT NO.        : 7,679,837 B2                                    Page 1 of 1
APPLICATION NO.   : 12/119698
DATED             : March 16, 2010
INVENTOR(S)       : Yoshihito Souma It is certified that error appears in the above-identified patent and that said Letters Patent is hereby corrected as shown below:

Column 31:
Line 59 claim 15, delete "$vd_1$" and insert -- $vd_{1n}$ --.

Signed and Sealed this

Eighteenth Day of May, 2010

David J. Kappos
*Director of the United States Patent and Trademark Office*